US006856932B1

(12) United States Patent
Wallace

(10) Patent No.: US 6,856,932 B1
(45) Date of Patent: Feb. 15, 2005

(54) FOOD INFORMATION MONITORING SYSTEM

(75) Inventor: Thomas E. Wallace, Charlotte, NC (US)

(73) Assignee: A la Cart, Inc., Charlotte, NC (US)

( * ) Notice: Subject to any disclaimer, the term of this patent is extended or adjusted under 35 U.S.C. 154(b) by 16 days.

(21) Appl. No.: 10/423,374

(22) Filed: Apr. 25, 2003

Related U.S. Application Data

(60) Provisional application No. 60/379,352, filed on May 10, 2002.

(51) Int. Cl.[7] .............................................. G06F 15/00
(52) U.S. Cl. ..................................... 702/130; 702/182
(58) Field of Search .......................... 62/125, 126, 127, 62/129, 237; 165/267; 219/620, 621; 702/81, 127, 130, 135, 136, 178, 182, 188, 173

(56) References Cited

U.S. PATENT DOCUMENTS

| | | | | |
|---|---|---|---|---|
| 4,387,578 A | * | 6/1983 | Paddock ....................... 62/127 |
| 4,482,785 A | | 11/1984 | Finnegan et al. ........... 179/5 P |
| 4,490,986 A | * | 1/1985 | Paddock ....................... 62/127 |
| 4,562,926 A | * | 1/1986 | Mode ........................... 206/563 |
| 4,619,221 A | * | 10/1986 | Linstromberg .............. 116/307 |
| 5,407,129 A | | 4/1995 | Carey et al. ............... 238/91 E |
| 5,460,006 A | | 10/1995 | Torimitsu ..................... 62/127 |
| 5,586,446 A | | 12/1996 | Torimitsu ..................... 62/126 |
| 5,797,445 A | * | 8/1998 | Westbrooks et al. ....... 165/11.1 |
| 5,900,801 A | | 5/1999 | Heagle et al. ......... 340/286.09 |
| 5,939,974 A | | 8/1999 | Heagle et al. ......... 340/286.09 |
| 5,946,922 A | | 9/1999 | Viard et al. .................. 62/126 |
| 5,951,900 A | | 9/1999 | Smrke ......................... 219/497 |
| 6,213,404 B1 | | 4/2001 | Dushane et al. .............. 236/51 |
| 6,222,440 B1 | | 4/2001 | Heller ....................... 340/10.3 |
| 6,264,889 B1 | * | 7/2001 | Tottenham et al. ........... 422/26 |
| 6,397,503 B1 | * | 6/2002 | Cain et al. ..................... 40/110 |
| 6,411,916 B1 | * | 6/2002 | Pellerin ....................... 702/130 |
| 6,453,687 B2 | * | 9/2002 | Sharood et al. ............... 62/127 |
| 6,577,969 B2 | * | 6/2003 | Takeda et al. ................ 702/81 |
| 6,609,078 B2 | * | 8/2003 | Starling et al. ............. 702/130 |
| 6,668,240 B2 | * | 12/2003 | Singh et al. ................ 702/188 |
| 6,684,657 B1 | * | 2/2004 | Dougherty ................... 62/237 |
| 2003/0127451 A1 | * | 7/2003 | Lile ........................... 219/497 |

FOREIGN PATENT DOCUMENTS

GB          2283845 A    *   5/1995     ........... G08B/25/10

OTHER PUBLICATIONS

Li, Y; Lee, M; Rodrigues, M;Rowland, J; "A Visually Guided Robot System for Food Handling Applications"; IEEE International Conference on Robotics and Automation; vol. 3; May 8–13, 1994; pp 2591–2596.*

Selected pages from Internet web site at www.etmpacific-.com, describing the FreshLoc System. Original publication date unknown, pages printed on Jan. 24, 2002.

Selected pages from Internet web site at www.freshloc.com, regarding "Automatic Logging, Alerts and Reports" original publication date unknown, pages printed on Jan. 24, 2002.

* cited by examiner

*Primary Examiner*—John Barlow
*Assistant Examiner*—Douglas N Washburn
(74) *Attorney, Agent, or Firm*—Kennedy Covington Lobdell & Hickman, LLP

(57)     ABSTRACT

Systems and methods for displaying food information to a user, involving assigning each of a plurality of remote sensor units to a designated food receptacle containing food, categorizing each food receptacle into one of a plurality of food receptacle types, and displaying, in a central location, an indication of the type of food receptacle to which the remote sensor unit is assigned and an indication of the food stored therein.

18 Claims, 18 Drawing Sheets

Central Monitor and Alert

Device Types Report

| Number | Description | Icon Name | Device Temperature Min (°F) | Device Temperature Max (°F) | Device Number Min | Device Number Max | Number of Minutes |
|---|---|---|---|---|---|---|---|
| 1 | Cooler | D:\CMA\devices\image1 | 30 | 40 | 1 | 100 | 1 |
| 2 | Hot Device | D:\CMA\devices\image2 | 200 | 400 | 101 | 200 | 1 |
| 3 | Cold Device | D:\CMA\devices\image3 | 30 | 50 | 201 | 300 | 1 |
| 4 | Blast Chiller | D:\CMA\devices\image4 | 0 | 30 | 301 | 400 | 1 |
| 5 | Refrigerator | D:\CMA\devices\image5 | 30 | 40 | 401 | 500 | 1 |
| 6 | Warmer | D:\CMA\devices\image6 | 100 | 200 | 501 | 600 | 1 |
| 7 | Freezer | D:\CMA\devices\image7 | -10 | 30 | 601 | 700 | 1 |
| 8 | Oven | D:\CMA\devices\image8 | 200 | 500 | 701 | 1000 | 1 |

Fig. 12

Central Monitor and Alert

Device Locations Report

| Number | Description | Icon Name | Maximum Transit Time |
|---|---|---|---|
| 1 | Room No. 1 | D:\CMA\rooms\image1 | 1 |
| 2 | Room No. 2 | D:\CMA\rooms\image2 | 1 |
| 3 | Room No. 3 | D:\CMA\rooms\image3 | 1 |
| 4 | Room No. 4 | D:\CMA\rooms\image4 | 1 |
| 5 | Room No. 5 | D:\CMA\rooms\image5 | 1 |
| 6 | Room No. 6 | D:\CMA\rooms\image6 | 1 |
| 7 | Room No. 7 | D:\CMA\rooms\image7 | 1 |
| 8 | Room No. 8 | D:\CMA\rooms\image8 | 1 |
| 9 | Room No. 9 | D:\CMA\rooms\image9 | 1 |
| 10 | Room No. 10 | D:\CMA\rooms\image10 | 1 |
| 11 | Room No. 11 | D:\CMA\rooms\image11 | 1 |
| 12 | Room No. 12 | D:\CMA\rooms\image12 | 1 |
| 13 | Room No. 13 | D:\CMA\rooms\image13 | 1 |
| 14 | Room No. 14 | D:\CMA\rooms\image14 | 1 |
| 15 | Room No. 15 | D:\CMA\rooms\image15 | 1 |
| 16 | Room No. 16 | D:\CMA\rooms\image16 | 1 |
| 17 | Room No. 17 | D:\CMA\rooms\image17 | 1 |
| 18 | Room No. 18 | D:\CMA\rooms\image18 | 1 |
| 19 | Room No. 19 | D:\CMA\rooms\image19 | 1 |

*Fig. 13*

| Central Monitor and Alert |||
|---|---|---|
| Device Contents Report |||
| Number | Description | Icon Name |
| 1 | Ice Cream | D:\CMA\foods\image1 |
| 2 | Meat | D:\CMA\foods\image2 |
| 3 | Caesar Salad | D:\CMA\foods\image3 |
| 4 | Soup | D:\CMA\foods\image4 |
| 5 | Pizza | D:\CMA\foods\image5 |
| 6 | Kabob | D:\CMA\foods\image6 |
| 7 | Nimroo | D:\CMA\foods\image7 |
| 8 | Vegetable | D:\CMA\foods\image8 |

*Fig. 14*

| Central Monitor and Alert ||||
|---|---|---|---|
| Pager Report ||||
| Number | Description | Icon Name | Maximum Transit Time |
| 1 | John Smith | johnsmith@CMA.com | 2 |
| 2 | Jane Doe | janedoe@CMA.com | 10 |
| 3 | John Doe | johndoe@CMA.com | 20 |

*Fig. 15*

Report Parameters Form

Report Type
Temperature ▼

Date:
- ○ Today
- ○ Yesterday
- ○ This Month
- ○ Last Month
- ○ From 4/12/02 ▼ To 4/12/02 ▼
- ○ All Dates

Device Number
- ○ Range From [ ] To [ ]
- ○ Any

Device Type
Type: Any ▼

[ Ok ]  [ Cancel ]

*Fig. 16*

Central Monitor and Alert

Log Report (Log Type: All)

| Date | Device Type | Time | Device Number | Log Type | Data | Occurs | Message |
|---|---|---|---|---|---|---|---|
| 4/5/02 | Cooler | 1:11 PM | 0 | Network | 0 | 18 | Timeout : Rq TM Status |
| 4/5/02 | Cooler | 1:12 PM | 0 | Network | 0 | 4 | Timeout : Rq Cart Location |
| 4/5/02 | Cooler | 1:13 PM | 0 | Network | 0 | 4 | Timeout : Rq Signal Strength |
| 4/5/02 | Cooler | 1:14 PM | 0 | Network | 0 | 5 | Timeout : Rq Ambient Temperature |
| 4/5/02 | Hot Device | 3:17 PM | 0 | Network | 219 | 1 | Cart Location |
| 4/5/02 | Hot Device | 3:17 PM | 0 | Network | 51 | 1 | Cart Location |
| 4/5/02 | Hot Device | 3:18 PM | 0 | Network | 69 | 2 | Cart Location |
| 4/5/02 | Hot Device | 3:18 PM | 0 | Network | 171 | 1 | Cart Location |
| 4/5/02 | Hot Device | 3:18 PM | 0 | Network | 81 | 1 | Cart Location |
| 4/5/02 | Hot Device | 3:18 PM | 0 | Network | 41 | 3 | Cart Location |
| 4/5/02 | Hot Device | 3:18 PM | 0 | Network | 94 | 1 | Cart Location |
| 4/5/02 | Hot Device | 3:18 PM | 0 | Network | 108 | 1 | Cart Location |
| 4/5/02 | Hot Device | 3:18 PM | 0 | Network | 20 | 2 | Cart Location |
| 4/5/02 | Hot Device | 3:18 PM | 0 | Network | 121 | 1 | Cart Location |
| 4/5/02 | Hot Device | 3:18 PM | 0 | Network | 17 | 1 | Cart Location |
| 4/5/02 | Hot Device | 3:18 PM | 0 | Network | 0 | 3 | Cart Location |
| 4/5/02 | Hot Device | 3:18 PM | 0 | Network | 93 | 1 | Timeout : Rs Location Msg |
| 4/5/02 | Hot Device | 3:18 PM | 0 | Network | 197 | 4 | Cart Location |
| 4/5/02 | Hot Device | 3:18 PM | 0 | Network | 83 | 1 | Cart Location |
| 4/5/02 | Hot Device | 3:18 PM | 0 | Network | 177 | 1 | Cart Location |
| 4/5/02 | Hot Device | 3:18 PM | 0 | Network | 215 | 1 | Cart Location |
| 4/5/02 | Hot Device | 3:18 PM | 0 | Network | 183 | 1 | Cart Location |
| 4/5/02 | Hot Device | 3:18 PM | 0 | Network | 78 | 1 | Cart Location |

Fig. 17

FOOD INFORMATION MONITORING SYSTEM

CROSS-REFERENCE TO RELATED APPLICATION

This application is entitled to the benefit of, and claims priority to, provisional U.S. Pat. Application Ser. No. 60/379,352 filed May 10, 2002 and entitled "WIRELESS FOOD INFORMATION MONITORING SYSTEM," the entirety of which is hereby incorporated by reference.

BACKGROUND OF THE PRESENT INVENTION

Field of the Present Invention

The present invention relates generally to food information monitoring systems, and, in particular, to systems and methods of displaying, at a central monitoring station, information pertaining to temperature and other food data that is collected from a plurality of remote locations in a food service facility.

BACKGROUND

A wide variety of food service facilities, such as food service operators, grocery stores, university kitchens, banquet halls, food manufacturers and the like, utilize various types of food storage, handling and preparation apparatuses and containers in their operations. These apparatuses and containers, collectively referred to herein as food receptacles, may include means for heating or cooling the food contained therein, and may be stationary (such as a refrigerator) or portable (such as a serving cart). Examples of such devices include, but are not limited to, blast chillers, walk-in coolers and freezers as well as smaller coolers and freezers, ice machines, docked refrigerated trucks, mobile hot and cold food serving carts, table-top food warmers and coolers, ovens and cookers. If the temperature of the food contained in a particular food receptacle is important, then each such food receptacle must be monitored on at least a periodic basis to ensure that the temperatures remain within a particular range. Oftentimes, other food conditions must be monitored as well. The facilities are frequently quite large, and frequently make use of multiple food receptacles, thus making it difficult to carry out the monitoring operations by hand. For example, a typical facility may have a main kitchen, food storage equipment, a cafeteria, banquet halls, service corridors, and the like, all of which may have food in various stages of storage or preparation. It may also be necessary to monitor the location of the food receptacles within the facility. Thus, a need has developed for a centralized food information monitoring system.

A variety of food and temperature monitoring systems have been proposed to address this need. For example, U.S. Pat. Nos. 5,900,801 and 5,939,974 to Heagle et al. disclose a universal system for monitoring and controlling remote site systems at a plurality of individual food service facilities. Each remote site system includes a network and a plurality of temperature sensors associated with refrigerators, freezers and the like. The sensors are wired into the network. Each remote site system may also may include a plurality of individual sensors and other devices, including temperature sensors, which are not associated with particular equipment or designated work stations.

U.S. Pat. No. 5,951,900 to Smrke discloses an automatic temperature measurement-based control device for a cooking pot which may use wireless technology to transmit temperature information to a central unit. The central unit may likewise use wireless technology to communicate with a central electronic unit which in turn communicates with a controller for controlling the power or heat source for the pot. A system may incorporate more than one pot, temperature sensing device, heat source transceiver, controller, and/or heat source.

U.S. Pat. No. 6,213,404 to Dushane et al. discloses a design for a wireless, battery-operated temperature sensing device for transmitting sensed temperature information to a programmable thermostat. The temperature sensing device transmits information only periodically, and thus the device is capable of operating on the same inexpensive set of batteries for a period of months or even years. A plurality of such devices may be used to collect and transmit temperature information from particular apparatuses or locations to corresponding thermostats, or to a single thermostat.

U.S. Pat. No. 4,482,785 to Finnegan et al. discloses a refrigeration monitor system for monitoring an unattended freezer installation having a number of separate freezer compartments. The monitor system includes a network of temperature sensors arranged in the freezer compartments and connected to a common control. The connection between the sensor network and the common control may be completed using a wireless communication link.

U.S. Pat. No. 5,407,129 to Carey et al. discloses a system for monitoring the temperature and other environmental data in a poultry house and controlling temperature, etc. accordingly. The system includes a plurality of temperature sensors disposed around the interior of the poultry house. The sensors are in communication with a controller.

Finally, U.S. Pat. No. 5,460,006 to Torimitsu discloses a system for contemporaneously monitoring a variety of food storage apparatuses. U.S. Pat. No. 5,586,446 to Torimitsu discloses a system for monitoring a large number of ice making machines. U.S. Pat. No. 5,946,922 to Viard et al. discloses a system for collecting information about the operation of actual operation of food processing apparatus in a food processing plant.

Known remote food monitoring systems all suffer from a variety of significant problems. For example, one problem facing prior art food condition monitoring systems is that each known system is adapted for use in a wired environment (i.e., an environment in which the data collection portion of the system is physically connected directly to the central monitoring portion of the system) or a wireless environment, but not both. Although it has been recognized that certain systems, such as those disclosed in U.S. Pat. Nos. 5,951,900 and 4,482,785, may be produced in either wired or wireless versions, no single prior art system has been disclosed that is adaptable to either environment. Unfortunately, systems having only a single mode of communication have a number of limitations not recognized in the prior art. For example, it is often desirable for food information monitoring systems to make use of previously-existing local area networks and computers. Such networks sometimes include wireless access points for making wireless connections thereto, and sometimes do not. If a particular prior art monitoring system is to make use of one of these networks, the system must be tailored to the existing environment. Also, if a particular network is to be upgraded from a wired type to a wireless type by adding wireless access points, a corresponding conversion would be required in the components of prior art systems from a "wired" version to a "wireless" version. Thus, a need exists for a system capable of being used in either environment, while requiring little or no conversion process, and an improved method of installation based on the nature of an existing network.

Another problem with many prior art food condition monitoring systems is that they rely on the sensing devices to communicate data directly to the central collection apparatus. Wireless systems in particular are problematic because of the potential for data collisions as multiple sensing devices communicate back and forth with the central collection apparatus, and the necessity for sufficient transmission strength to ensure reliable communications, even when the sensing device is relatively distantly located from the central collection apparatus. Unfortunately, as the number of sensing devices in use in a particular food service facility increases, the propensity for data collisions increases dramatically. Further, strong transmission signals demand large amounts of power, thus either requiring the sensing devices to be "plugged in" or else severely limiting their battery life. Rather than confront the myriad issues raised by the use of wireless devices, many systems utilize dedicated wiring between each sensing device and the central collection apparatus.

Unfortunately, attempts to use some sort of intermediate unit that communicates with both the sensing devices and the central collection apparatus have shortcomings. For example, in the system of U.S. Pat. No. 5,951,900, temperature data is transmitted from a sensing device on the lid of a pan to an intermediate unit in the form of a controller and then wirelessly transmits control instructions from the controller to a heating unit, but this intermediate unit fails to relay the temperature data detected by the sensing device to the heating unit. In another example, U.S. Pat. No. 4,482,785 discloses a system in which sensing devices transmit detected temperature data to an intermediate unit which monitors the temperature data for alarm conditions and then wirelessly notifies a central apparatus when such an alarm condition exists, but fails to relay the temperature data itself. Thus, a need exists for an intermediate translator unit that relays temperature data from a plurality of sensing devices to a central collection apparatus, and particularly for a translator unit that receives data wirelessly from the sensing devices and relays the data wirelessly to the central collection apparatus.

As previously noted, it is often desirable for food information monitoring systems to make use of previously-existing local area networks and computers, because, among other factors, installing a new network, dedicated wires, wireless transceivers, and other equipment can be very expensive. Unfortunately, many food condition monitoring systems use proprietary or other non-standard communication protocols or the like, and are thus incapable of using existing equipment. Thus, a need exists for a system that is readily adaptable to standard wired and wireless network technology. Further, because Ethernets are already installed in so many food service facilities, a particular need exists for Ethernet-compatible food condition monitoring systems.

Another shortcoming of prior art temperature monitoring systems is their inability to handle more than one set of temperature data from any one sensor. In many situations, it is important to be able to remotely monitor more than one temperature associated with a single food, such as, for example, the ambient temperature surrounding the food as well as the core temperature of the food. Although a variety of temperature sensing devices are known that may be installed in a remote location to monitor a particular temperature characteristic and relay temperature data back to a central collection system, such sensing devices rely on only a single physical sensor. Further, the communication methodologies used to relay the sensed data back to the central collection system are not equipped to handle two different data sets. Unfortunately, the only way to remotely monitor two different temperatures with any known system is to install two separate remote sensors, which is prohibitively expensive and increases the complexity of the intra-system communications that must be carried out. Thus, a need exists for a system and method for monitoring more than one temperature characteristic in a particular location with a single remote unit.

Another problem with the remote units in prior art food monitoring systems is the inability to customize the settings of each remote unit based on the application for which it is to be used. In most systems, the remote sensor units are designed to be permanently installed in one location, and thus there is little need to update the settings for the sensor unit. However, in more sophisticated monitoring systems, and particularly in such systems where case of installation is important, the ability to input application-specific data into the remote unit itself can be very important. Unfortunately, the few user interfaces includes with known sensor units are very limited in scope. For example, U.S. Pat. Nos. 5,900,801 and 5,939,974 each include a display for displaying detected measurements, but does not disclose the ability to input information about the particular situation in which the unit is to be used. Similarly, U.S. Pat. No. 6,213,404 discloses a method for a user to input an identifier for the sensor unit, but not for the food receptacle with which the sensor is to be used. Further, although handheld temperature sensing devices may have greater programmability, they unfortunately are not capable of being used in a remote real time monitoring context. Thus, a need exists for a food monitoring system that allows a user to input information about how a particular sensor unit is to be used directly into the sensor unit.

Similarly, it is also useful to facilitate the customization of a particular remote unit based on its intended use by presenting possible options to a user in the form of menus displayed in a built-in graphical interface in the remote unit. However, it may be necessary to change the menu options. Unfortunately, this may require the sensor unit to be reprogrammed or the like, which may be time-consuming or demand particular technical expertise. Thus, a need exists for a food monitoring system in which the menu options available through the various remote sensor units may be easily updated by downloading new options directly from the central computer of the monitoring system.

Another problem facing wireless remote food monitoring systems is the issue of how to handle sensed data when wireless communications are temporarily inoperative. Previous food information monitoring systems, such as the wireless system disclosed in U.S. Pat. No. 5,951,900 do not address this. Although handheld temperature sensing devices typically include a memory device that holds a large number of temperature measurements until the measurement data can be downloaded into a computer for review and analysis, but are unsuitable for use in a centralized monitoring environment. Thus, a need exists for a wireless food monitoring system that temporarily buffers detected food information until a wireless communication link may be reestablished.

Another issue facing remote food monitoring systems is how to manage the collection of data from multiple remote sensor units. U.S. Pat. Nos. 5,900,801 and 5,939,974 each disclose a system whereby a central unit polls various sensor units for their data, thereby controlling when each sensor unit transmits data and avoiding data collisions. However, this system uses wired connections between all sensor units and the central unit, thus making communications much simpler than they would be in a wireless environment. U.S. Pat. No. 5,951,900 discloses a wireless system in which two-way communications take place between a central unit and a sensor unit. However, the disclosed system appears to use only a very limited number of sensor units, thus simplifying the communication management needs of the system, and the patent does not disclose a methodology for controlling when the sensor units are to transmit data to the central unit. Thus, a need exists for a two-way wireless communications management system for a remote food monitoring system whereby individual sensor units may be polled for data under the control of a central computer.

Another shortcoming of existing remote food monitoring systems is their inability to track whether a particular remote unit in the system is currently active. Unfortunately, when the central computer of such a system is unaware that a particular remote unit is inactive, valuable time or processing capability may be wasted attempting to communicate with the sensor unit, and false alarms may even be generated by a false out-of-range temperature reading for the sensor. It may also be useful to provide a list of active and inactive remote sensor units to a user for planning purposes. Thus, a need exists for a remote food monitoring system capable of compiling a list of which remote units are active and which ones are not.

Another problem faced by known remote food monitoring systems is the difficulty inherent in organizing the data received from the various remote sensor units into a manageable format for review by a user. Sophisticated modem monitoring systems often utilize large numbers of sensor units located in multiple areas of a food service facility. Unfortunately, known prior art systems do not provide any means for grouping together sensor units sharing a common characteristic, such as being located in a particular area or room in the food service facility. As a result, a user usually needs to search through information pertaining to all sensor units in the system, which may be very time-consuming, especially if large numbers of sensor units are involved. Thus, a need exists for a way to group subsets of sensor units together to facilitate easier review and analysis by a user.

Another problem encountered by known remote food monitoring systems is that they are not typically intended to be used to monitor food in food receptacles that are regularly moved from place to place. As a result, they generally have no mechanism for automatically determining where a particular remote sensor unit is located at any given time. However, in food service facilities utilizing large numbers of sensor units or utilizing sensor units in a large area, it is often important for personnel to be able to physically check on a particular sensor unit quickly, and if the exact position of the sensor unit is not known, a considerably amount of time may be consumed in searching for the proper unit. U.S. Pat. No. 6,222,440 discloses a triangulation method for identifying a precise location of a particular sensor unit, but the method is extremely complex and requires highly specialized equipment. Thus, a need exists for a simple remote food monitoring system that automatically determines the location of each sensor unit in the system. Further, no system is known that permits a user to define a proper location for a particular sensor unit and then monitor the actual location of the sensor unit and alert the user when the sensor unit is in the wrong location. Thus, a particular need exists for a system capable of alerting a user when a sensor unit is in the wrong location.

Another shortcoming of known remote food monitoring systems is the lack of information such systems provide to a user about what is actually being monitored. Existing systems may provide the user with food temperature data itself, but fail to inform the user about the food being monitored, the food receptacle containing the food and the like. Instead, the user must typically manually track which sensor unit is monitoring which food and the like. Unfortunately, modem sophisticated applications demand greater detail than is available using other systems. Thus, a need exists for a remote food monitoring system that monitors a plurality of food receptacles and provides a user not only with data regarding the temperature of the food and the like, but also informs the user as to the type of food being monitored and the type of food receptacle that contains the food.

One important purpose of a remote food monitoring system is to alert users to the existence of a problem condition in a food or food receptacle being monitored as soon as possible. Known systems use a variety of means for alerting users. For example, U.S. Pat. No. 4,482,785 discloses the use of a telephone exchange to automatically dial a predetermined telephone number in the event of a temperature problem. Other systems use a variety of on-board alarm signals to alert a user to a problem. However, none of the prior art systems take are sophisticated enough to generate an alarm at both the sensor unit triggering the alarm and at a central monitoring station. Thus, a need exists for a system in which a sensor unit transmits temperature data to a central monitoring station for analysis, and when an out-of-bounds condition is encountered, the central monitoring station signals the remote sensor to generate an alarm signal in addition to an alarm being generated at the central monitoring station.

Another problem facing existing remote food monitoring systems is the general inconvenience involved in setting a desired temperature range for each separate remote temperature sensor, the desired temperature range being defined as the range of suitable temperatures for a particular food. Such desired temperatures may be established by law or regulation, according to user preference, or the like. Known methods for setting temperature ranges are frequently awkward and time-consuming. Depending on the application in which the sensors are employed, every sensor in the system may use the same temperature range, in which case the range is rarely adjusted once it has been set the first time. However, if every sensor unit uses a different range, or if the range must frequently be changed, then the ease with which a particular range may be updated becomes significant. Thus, a need exists for an improved system and method for adjusting the desired temperature range of each sensor unit.

SUMMARY OF THE PRESENT INVENTION

The present invention comprises a system utilizing a multiplicity of multifunctional battery-operated temperature sensors for gathering temperature and other data from food receptacles and forwarding the data, via a standardized wireless communication protocol, to at least one wireless data collection point, and from there to a computer system for further collection, analysis and processing using a corresponding software application. Broadly defined, the present invention according to one aspect is a food information system that includes a plurality of remote units, each having a sensor device that detects data indicative of a particular food condition, where each remote unit is assigned to a designated food receptacle containing food, and where the food receptacle and the food are each of a categorizable type; a central computer that gathers data from the plurality of remote units; and a graphical user interface, operable in conjunction with the central computer, that displays to a user a graphical entry for each remote unit, an indication of the type of food receptacle to which each respective remote unit is assigned, and an indication of the type of food contained in the food receptacle to which each respective remote unit is assigned.

In features of this aspect, the graphical user interface is further operable, in conjunction with the central computer, to display to a user the data detected by each remote unit; each sensor device includes a temperature sensor, and the detected data includes a temperature measurement; the graphical entries for the plurality of remote units are arranged in a table; the graphical entry for each remote sensor unit is an icon; the indication of the food receptacle type is a text message superimposed over the respective remote sensor unit icon; the indication of the food type is a text message superimposed over the respective remote sensor unit icon; a unique icon is associated with each different food receptacle type, and the type of icon that is displayed for each remote unit is indicative of the food receptacle type to which the respective remote unit is assigned; a unique icon is associated with each different food type, and the type of icon that that is displayed for each remote unit is indicative of the type of food contained in the food receptacle to which the respective remote unit is assigned; the graphical user interface is further operable, in conjunction with the central computer, to display to a user a unique identification number for each remote unit; and the graphical user interface is further operable, in conjunction with the central computer, to display to a user an indication of whether or not an alarm condition exists for each remote unit.

In another aspect of the present invention, a method in a computer system for displaying food information to a user includes assigning each of a plurality of remote sensor units to a designated food receptacle containing food; categorizing each food receptacle into one of a plurality of food receptacle types; and, for each assigned remote sensor unit, displaying, at a central location, an indication of the type of food receptacle to which the remote sensor unit is assigned and an indication of the food stored in the food receptacle to which the remote sensor unit is assigned.

In features of this aspect, the method further includes categorizing foods that may be stored in each food receptacle into one of a plurality of food types; the step of displaying, for each remote sensor unit, an indication of the food stored in the food receptacle to which the remote sensor unit is assigned includes displaying an indication of the type of food stored in the food receptacle; the method further includes detecting, at each remote sensor unit, data indicative of a particular food condition; the particular food condition that is detected is a food temperature; the method further includes displaying, at a central location, the data detected by each remote sensor unit; and the detected data is displayed in real time.

BRIEF DESCRIPTION OF THE DRAWINGS

Further features, embodiments, and advantages of the present invention will become apparent from the following detailed description with reference to the drawings, wherein:

FIG. 12 is a preferred display screen for use in a graphical user interface for configuring food receptacle types;

FIG. 13 is a preferred display screen for use in a graphical user interface for configuring food receptacle locations;

FIG. 14 is a preferred display screen for use in a graphical user interface for configuring food receptacle contents;

FIG. 15 is a preferred display screen for use in a graphical user interface for controlling paging information;

FIG. 16 is a preferred display screen for use in a graphical user interface for controlling the parameters used in the generation of a log report; and FIG. 17 illustrates a preferred report format for a log report.

DETAILED DESCRIPTION OF THE PREFERRED EMBODIMENTS

Figure 1:
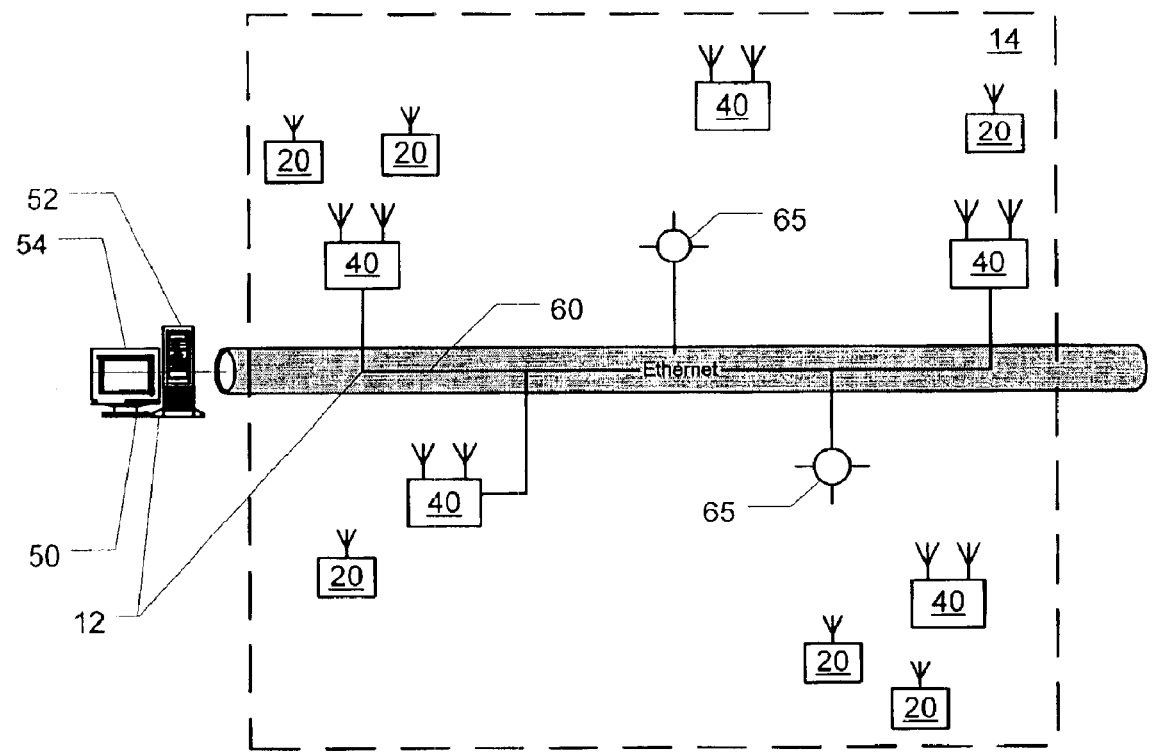
FIG. 1 is a block diagram of the system of the present invention.

Referring now to the drawings, in which like numerals represent like components throughout the several views, a wireless food information monitoring system 10, in accordance with the preferred embodiments of the present invention, is next shown and described. FIG. 1 is a block diagram of the system 10 of the present invention. The system 10 comprises a shared computer system 12 and a monitoring system 14. The shared computer system 12, which may generally be shared with other computer systems and functions, includes a central monitoring station 50 and a communications network 60 for connecting the central monitoring station 50 to the hardware portions of the monitoring system 14. The monitoring system 14 includes a plurality of sensor units 20 disposed on or adjacent to food receptacles 110, one or more translator units 40, a central monitoring and alert software application (referred to hereinafter as the "CMA") 70 for the central monitoring station 50 and a communications protocol 90 for facilitating communication between the various components. Each of the system elements will be discussed in greater detail hereinbelow.

In a primary application of the present invention, the system 10 is used to monitor conditions in food receptacles 110 in and around a food service facility 100. As used herein, the term "food receptacle" refers to food storage, handling or preparation apparatuses or containers. As described previously, food receptacles 110 may include means for heating or cooling the food contained therein, and may be stationary (such as a refrigerator) or portable (such as a serving cart). Food receptacles 110 suitable for use with the present invention may include, but are not limited to, blast chillers, walk-in coolers and freezers as well as smaller coolers and freezers, ice machines, docked refrigerated trucks, mobile hot and cold food serving carts 400, table-top food warmers and coolers, and, with suitable extended-temperature thermocouples installed, ovens and cookers. Further, the term "food service facility" refers to any facility involved in the manufacture, processing, preparation or service of food, and may include food service operators, grocery stores, university kitchens, banquet halls, food manufacturers, restaurants and the like.

The central monitoring station 50 includes a computer 52 and a display unit 54. The computer 52 may be any computer capable of communicating with a communications network 60 and of executing software having the functionality of the CMA 70 when an appropriate operating system is present. However, although not required, it is anticipated that in the commercial embodiment of the present invention, the system 10 will make use of a food service facility's existing computer and communications network 60, and that most such central computers will be "server"-type computers. For that reason, the computer 52 will be referred to hereinafter as the server 52. A server 52 suitable for use in a preferred embodiment of the present invention is a Microsoft Windows NT/2000 Web Server of any commercially available manufacture. Likewise, although not required, it is anticipated that in the commercial embodiment of the present invention, the system 10 will make use of a facility's existing communications network 60. The communications network 60 involves one or more wires or cables routed strategically between the server 52 and one or more other locations in a food service facility 100, to permit communication between various network components, and a suitable network interface or controller for each network component. Further, although possibly helpful, it is not required that the central monitoring station 50 be located in a "central" location. Instead, the central monitoring station 50 may be selected based on convenience, and in some cases, on proximity to the communications network 60.

In an embodiment suitable for use with the present invention, the communications network 60 is a local area network of the TCP/IP Ethernet type, but it should be apparent that other network types may likewise be used. The communications network 60 may also include one or more wireless network access points 65 for facilitating wireless communication between one or more network components. If wireless network access points 65 are already installed with an existing communications network 60 as described above, then the system 10 may make use of such access points 65 where possible. If such wireless network access points 65 are incorporated into the communications network 60, their existence should be transparent to network components; that is, the network components themselves need not be aware of the protocols and interfaces necessary to facilitate wireless communication with the wireless network access points 65. For example, each wireless network access point 65 may include a wireless transceiver for communication with the translator units 40 and a TCP/IP Ethernet or other network interface for communication with the server 52. The design and implementation of such a network 60 would be obvious to one of ordinary skill in the art.

Figure 2:
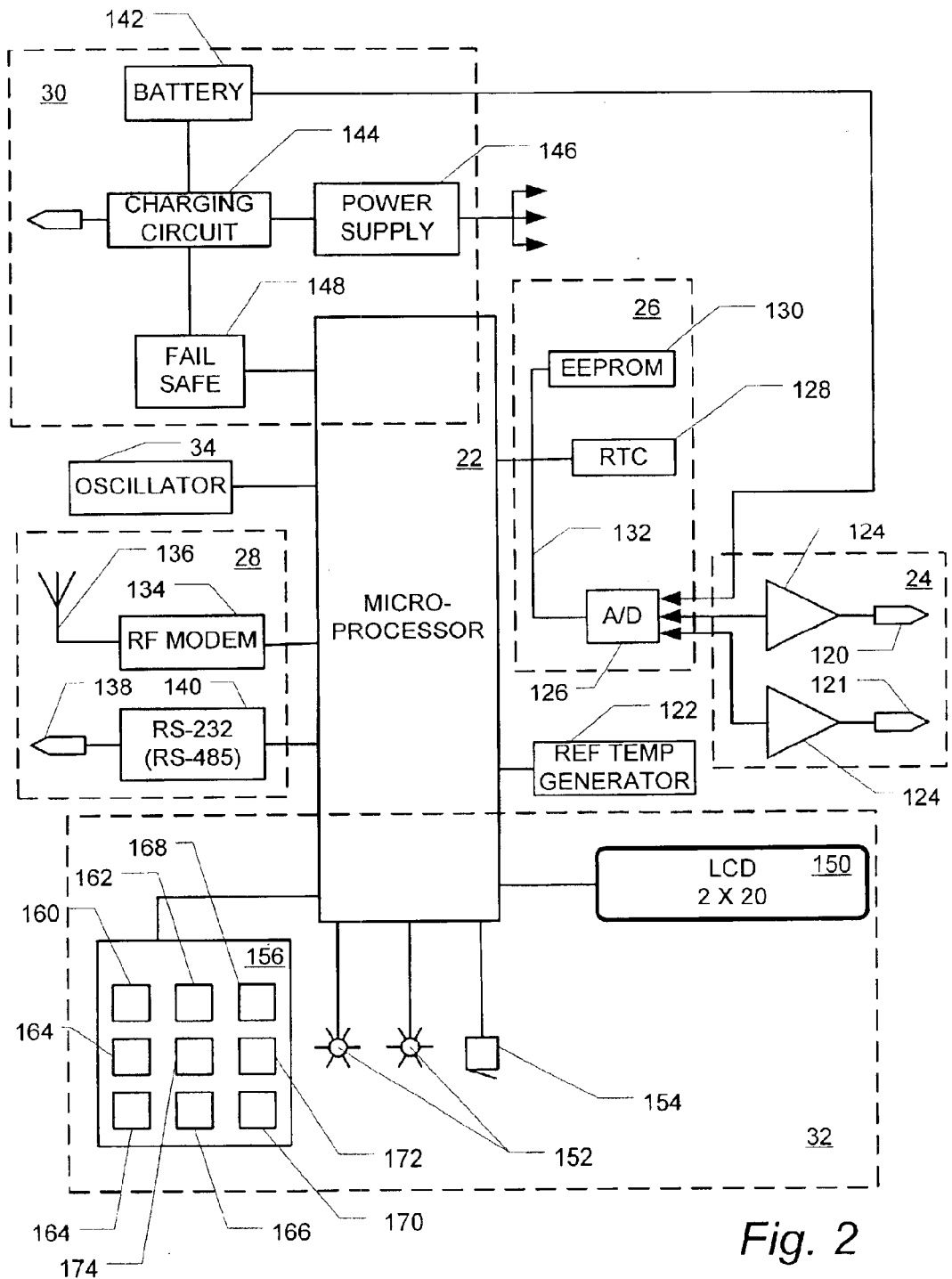
FIG. 2 is a block diagram of the hardware components of the sensor unit of FIG. 1 in accordance with the preferred embodiments of the present invention.

Each sensor unit 20 includes both hardware and software components. FIG. 2 is a block diagram of the hardware components of the sensor unit 20 of FIG. 1 in accordance with the preferred embodiments of the present invention. The sensor unit hardware includes a microprocessor 22 and a variety of peripheral components surface mounted on a single printed circuit board. The microprocessor 22 is preferably a 9-bit processor with at least 8K of program memory. A microprocessor suitable for use with the present invention is the Motorola MC68HC705. The peripheral components include a temperature input subsystem 24 for providing temperature readings, an onboard data subsystem 26 for providing data developed or stored within the sensor unit 20 to the microprocessor 22, a communications subsystem 28 for sending and receiving data to and from external components, a power subsystem 30, a user interface subsystem 32 and an oscillator 34.

The temperature input subsystem 24 includes a pair of thermocouple sensors 120, 121 and an amplification stage 124. Because the thermocouple sensors 120, 121 are likely to be exposed to high temperatures for extended periods of time, the thermocouple sensors 120, 121 are preferably "type K" thermocouple sensors, although other types of thermocouple sensors, including "type T" sensors, may be used as well. Preferably, the first junction of each thermocouple sensor 120, 121 may be connected to a stainless steel probe that can be easily mounted to a portable food serving cart 400. The second junction of each thermocouple sensor 120, 121 is connected to a known reference voltage, which may be generated by the reference temperature generator 122. Each thermocouple sensor 120, 121 generates a small voltage differential based upon the difference between the temperature of its probe and the reference voltage. The respective voltages generated by each thermocouple sensor 120, 121 are amplified by the amplification stage 124 and provided as inputs to the data conversion and storage subsystem 26. In a preferred embodiment, a first thermocouple sensor 120 and its probe are designed or selected for use in measuring an ambient temperature in a food receptacle 110, while a second thermocouple sensor 121 and its probe are designed or selected for use in measuring the core temperature of the food stored in such an apparatus. The latter probe may be, for example, a "needle" probe or an immersion-type probe. However, it should be obvious that the thermocouple sensors 120, 121 and their probes may each be used for different purposes, that additional thermocouple sensors and probes (not shown) may likewise be used for the same or different purposes, and that the design or selection of each would be apparent to one of ordinary skill in the art based on the purpose for which the thermocouples sensors and probes are to be used.

The onboard data subsystem 26 includes an analog-to-digital ("A/D") converter 126, a real-time clock ("RTC") 128, and an EEPROM 130, each of which is connected to the microprocessor 22 via a serial peripheral interface ("SPI") bus 132. The A/D converter 126, which is preferably a 12-bit bipolar input A/D converter of a well-known type, accepts input signals from the temperature input subsystem 24 and from the battery pack 142 and converts each respective voltage level to a digital value. The RTC 128 keeps track of real-time time and day information and provides this information to the microprocessor 22 upon request at power-on. It has its own crystal oscillator and power backup circuitry. The EEPROM 130 is used to store parameters when the sensor unit 20 is powered off.

The communications subsystem 28 includes a RF modem 134, an antenna 136, a serial I/O port 138, and one or more serial interfaces 140. The RF modem 134 is preferably of minimal size and of a type capable of communicating using one or more market standard wireless communication protocols. More preferably, the RF modem 134 is a 900 MHz serial communications unit. RF modems suitable for use with the present invention include the 9XStream™ series of wireless modems available from MaxStream, Inc. of Orem, Utah. The antenna 136 may be an external antenna with a size concomitant with the overall size of the sensor unit 20. In a preferred embodiment, the antenna 136 is about 4 inches long and mounted on the sensor unit's enclosure. The serial I/O port 138 and serial interface 140 make it possible to connect other peripheral components to the microprocessor 22. In a preferred embodiment, the serial I/O port 138 has a fixed baud rate of 9600 N-8-1, standard ASCII. Preferably, at least one standard interface, such as a RS-232 or RS-485 interface, is provided so that a wider variety of peripheral components may be readily connected. Peripheral components suitable for use with the present invention may include external sensing devices or other data sensing, detecting or measuring devices (such as temperature sensing devices), but may also include a variety of intelligent food equipment; i.e., food receptacles that include a microprocessor or microcontroller and an input/output port, such as intelligent refrigerators, intelligent serving carts, and the like. In an embodiment suitable for use with a preferred embodiment of the present invention, both a RS-232 and a RS-485 interface are provided, and means are provided for a user to select which interface is to be activated. This enables any device capable of communicating with either an RS-232 or RS-485 device to be connected to the microprocessor 22.

The power subsystem 30 includes a battery pack 142, a battery charging circuit 144, a power supply 146 and a battery fail safe 148. The battery pack 142 is provided to permit the sensor unit 20 to operate for an extended period of time, preferably a day or more, in locations where wall power is not available. Among other benefits, this permits use of the sensor unit 20 on a portable food serving cart 400. In a preferred embodiment, the battery pack 142 includes 3 AA Nickel Cadmium (NiCad) batteries rated at 700 mAHrs and are designed for rapid charging in about 2 hours. Other types of batteries, such as Nickel-Metal-Hydride (NiMH) may be used if a longer battery life is desired. The battery charging circuit 144 may utilize an external power source and preferably operates in at least two modes: rapid charging and trickle charging. When recharging a depleted battery pack 142, rapid charging may first be employed to quickly recharge the battery pack 142 at 1C (500 mA) to its fully charged level. After a predetermined period, or when the voltage of the battery settles on a constant value or begins to drop, the battery charging circuit 144 may switch from rapid charging to trickle charging, whereby the voltage level is maintained with a trickle charge at 0.1 C (75 mA) for as long as the battery charging circuit 144 remains connected to the external power source. The power supply 146 includes a simple DC-DC switcher circuit to convert the output of the battery pack 142 to a suitable level, which in an embodiment suitable for use in the present invention may be +5 volts, and an additional converter to generate a corresponding negative voltage (for example, −5 volts) for the sensor unit's analog circuits. The battery fail safe 148 monitors the battery pack voltage levels and triggers a controlled shutdown of the microprocessor 22 in the event the battery pack 142 becomes excessively depleted during operation, thus preventing loss of data or damage to the sensor unit 20.

The user interface subsystem 32 includes a display 150, a pair of indicator lights 152, 153, an audio alarm 154 and a keypad 156. The display 150 has sufficient space to display simple messages to a user in text format. In a preferred embodiment, the display 150 is an LCD-type display that includes at least two lines of twenty text characters each (2×20) and that may or may not include a backlight. The LCD 150 preferably communicates with the microprocessor 22 via an interface that includes a 4-bit data bus and a factory-preset contrast adjustment resistor. The indicator lights 152, 153 and the audio alarm 154 may be controlled by the microprocessor 22 to provide a user with visual or aural indications, respectively, of certain predefined conditions. Preferably, the two indicator lights 152, 153 are LED's, one of which is used to indicate whether the RF modem 134 has an active RF link, and the other of which is used to indicate whether an alarm condition exists. The presence of an active RF link may be readily established using the RF modem's built-in signal strength indicator, the design and use of which would be obvious to one of ordinary skill in the art. Also preferably, the audio alarm 154 is used to indicate whether an alarm condition exists. The use of the alarm LED 153 and the audio alarm 154 to indicate the existence of an alarm will be more fully described hereinbelow. The keypad 156 may be a standard membrane keypad wired in a simple X—Y matrix. In an embodiment suitable for use with the present invention, the keypad includes an "On/Off" key 160, a "Menu" key 162, two "Arrow" keys 164, an "Enter" key 166, a "Silence" key 168, a "Food Probe" key 170, a "Celsius/Fahrenheit" key 172 and a "Clear" key 174, the functions of which will be explained hereinbelow.

The operation of the microprocessor 22 and the peripheral components is controlled by the software components of the sensor unit 20. The software is preferably in the form of microcode 85, which may be stored in the program memory of the microprocessor 22. The microcode 85 preferably includes multiple modules, each of which supports a particular function or device, linked together by a support program. This permits the modules to be written independently and later linked together to form the final code. The modules, which are preferably written in assembly language, may include the following, the actual code being easily developed by one of ordinary skill in the art: Initialize, Main, User Interface, Keypad, Display, Clock, Probes, TC_Convert, TC_Reference, TC_Tables, Battery Status, Battery Charger, User Serial Port, Host Serial In, Host Serial Out, A/D Converter, Math, Timer_IRQ, Checksum, Maintenance, and Internal Self-Test. The function of each of these modules is briefly described in Table 1.

TABLE 1

| Module | Function |
| --- | --- |
| Initialize | Initializes the microprocessor and peripheral components such as the display and sets up the software startup variables |
| Main | Controls general operation of module by processing "events" as they are received |
| User Interface | Receives keypad entries via the Keypad module and responds based on user interface algorithm |
| Keypad | Scans the keypad to detect a key press and returns the key location to the User Interface module |
| Display | Sends message packets from the User Interface module to the display unit for display |
| Clock | Interfaces with RTC to gather time and day information |
| Probes | Determines what thermocouple probes are installed in the unit |

TABLE 1-continued

| Module | Function |
|---|---|
| TC_Convert | Uses subroutines to return the temperature of a selected thermocouple sensor |
| TC_Reference | Returns the temperature of the known thermocouple reference |
| TC_Tables | Converts a relative number from A/D Converter, representing a temperature, to an actual temperature value using a lookup table corresponding to the thermocouple type (in a preferred embodiment, the table range is from −20 degrees C. to 350 degrees C.) |
| Battery Status | Monitors the voltage level of the battery and 1) provides the user with one or more "low battery" indications, and 2) halts the operation of the sensor unit when the battery is "dead" |
| Battery Charger | Determines whether battery charger is installed and controls the battery charging sequence |
| Serial Port | Receives data from the serial I/O port and relays it to the translator unit via the RF modem and antenna |
| Host Serial In | Receives packets of data from a translator unit via the RF modem and antenna |
| Host Serial Out | Transmits packets of data to the translator unit via the RF modem and antenna |
| A/D Converter | Converts the thermocouple output voltage levels and battery voltage level to relative numbers |
| Math | Performs simple math operations required by TC_Convert, TC_Reference and TC_Tables to support interpolation of temperature values |
| Timer_IRQ | Triggers initiation of other operations and provides timeout timers for error testing |
| Checksum | Tests the program memory by calculating a checksum of the program memory and comparing the result to a previously-calculated value |
| Maintenance | Receives command packets via the serial I/O port and returns requested test information |
| Internal Self-Test | Verifies operability of program memory, EEPROM, A/D converter, and the like |

Figure 3:
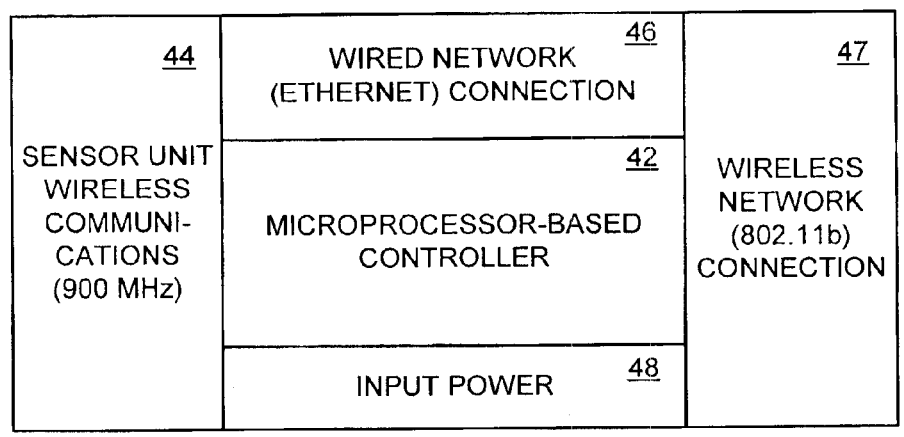
FIG. 3 is a schematic diagram of the layout of the hardware components of the translator unit of FIG. 1 in accordance with the preferred embodiments of the present invention.

Each translator unit 40 likewise includes both hardware and software components. FIG. 3 is a schematic diagram of the layout of the hardware components of the translator unit 40 of FIG. 1 in accordance with the preferred embodiments of the present invention. The translator unit hardware includes a microprocessor-based controller 42 and a plurality of peripheral components, including a sensor unit wireless communication subsystem 44, a wired network connection subsystem 46 for facilitating wired communication with the server 52 via the communications network 60, and a power supply subsystem 48. The sensor unit wireless communication subsystem 44 includes the circuitry, antenna or antennae, and other components necessary to facilitate bi-directional wireless communication between the translator unit 40 and the sensor units 20. The design of these components is dependent upon the protocol chosen for such communication and would be well known, based on the protocol selected, to one of ordinary skill in the art. As noted previously, the sensor units 20 and the translator units 40 must utilize the same communication protocol in order for permit communication therebetween. In a preferred embodiment, the sensor unit wireless communication subsystem 44 is a FCC-approved 900 MHz spread spectrum transceiver capable of line of sight transmission of at least 300 feet. Power is supplied to this subsystem 44 by the power supply subsystem 48.

Although, in the embodiments described and illustrated herein, all communications between the sensor units 20 and the translator units 40 take place using wireless technology, it will be apparent that many of the aspects and features of the system and methods of the present invention may alternatively be carried out using a direct electrical connection between the respective sensor units 20 and translator units 40. In such an alternative embodiment, a wired communication subsystem could be substituted for the wireless communication subsystem 44, and communications could take place using any of a variety of known communication protocols. The design of such components would be well known to one of ordinary skill in the art.

The wired network connection subsystem 46 includes a network controller and a proper physical connector or output adapter for electrically connecting the translator unit 40 into the communications network 60. Because it is intended for the system 10 to be usable with preexisting communications networks 60, the controller and connector/adapter are preferably chosen to be compatible with one or more of the most standard communications networks in commercial use today. Thus, because the most common communications network is an Ethernet-type network, the controller is preferably a 10/100 Base-T Fast Ethernet controller, and the connector is an RJ-45 connector.

The power supply subsystem 48 receives electrical power from the facility's electrical wiring system and includes circuitry as necessary for converting the power to the levels required by the translator unit 40. The circuitry may be disposed in either a "wall brick" or internally. Power supply units suitable for use with the present invention are readily available "off-the-shelf," and their selection and implementation would be obvious to one of ordinary skill in the art.

Preferably, the translator unit 40 further includes a wireless network connection subsystem 47 for wirelessly connecting the translator unit 40 with the communications network 60. By including both a wired network connection subsystem 46 and a wireless network connection subsystem 47 in the translator unit 40, the monitoring system 14 is flexible enough to be used in either direct-wired or wireless environments. The wireless network connection subsystem 47 includes the circuitry, antenna and other components necessary to facilitate bi-directional wireless communication between the translator unit 40 and a wireless network access point 65 that may be wired directly into the communications network 60. The design of these components is dependent upon the protocol chosen for such communication and would be well known, based on the protocol selected, to one of ordinary skill in the art. Because the system 10 is intended for use with preexisting communications networks 60 and wireless network access points 65, the protocol is preferably chosen to be compatible with one or more of the most standard wireless communications network protocols in commercial use today. Because most development work is currently being carried out in the 2.4 GHz frequency band (defined by the International Telecommunications Union (ITU) Radio Regulations as an Industrial, Scientific and Medical radio frequency band in the frequency range 2400 MHz to 2483.5 MHz), it is also preferable that the protocol be one of the protocols established as an industry standard for local wireless communications in that frequency range. Thus, in a preferred embodiment, the protocol is the IEEE 802.11b standard, the Bluetooth standard, or the HomeRF standard, with the first commercial embodiment utilizing the 802.11b standard. However, as other standards in the 2.4 GHz band and other bands, such as the 5 GHz frequency band (5.15 GHz to 5.825 GHz) and others, may also be selected in order to make the system 10 compatible with other commercially-common protocols.

The overall construction of the translator unit 40 may be dependent upon the amount of time and cost available for development. If development time is an issue, then in a preferred embodiment, the microprocessor and peripheral components are combined together in a single board computer ("SBC"), suitable examples of which include the Gene-4310 Series SBC, available from Aaeon of Taipei, Taiwan, and the BL2000 Smartcard SBC, available from Z-World of Davis, Calif. The operation of the translator unit 40 is controlled by the translator software 87. The software 87 for such a unit may be based on a standard PC operating system (i.e., Windows) or may be an embedded system. If an SBC is utilized, the code may be developed on a PC platform utilizing code supplied with the SBC, and then downloaded into the SBC.

Figure 4:
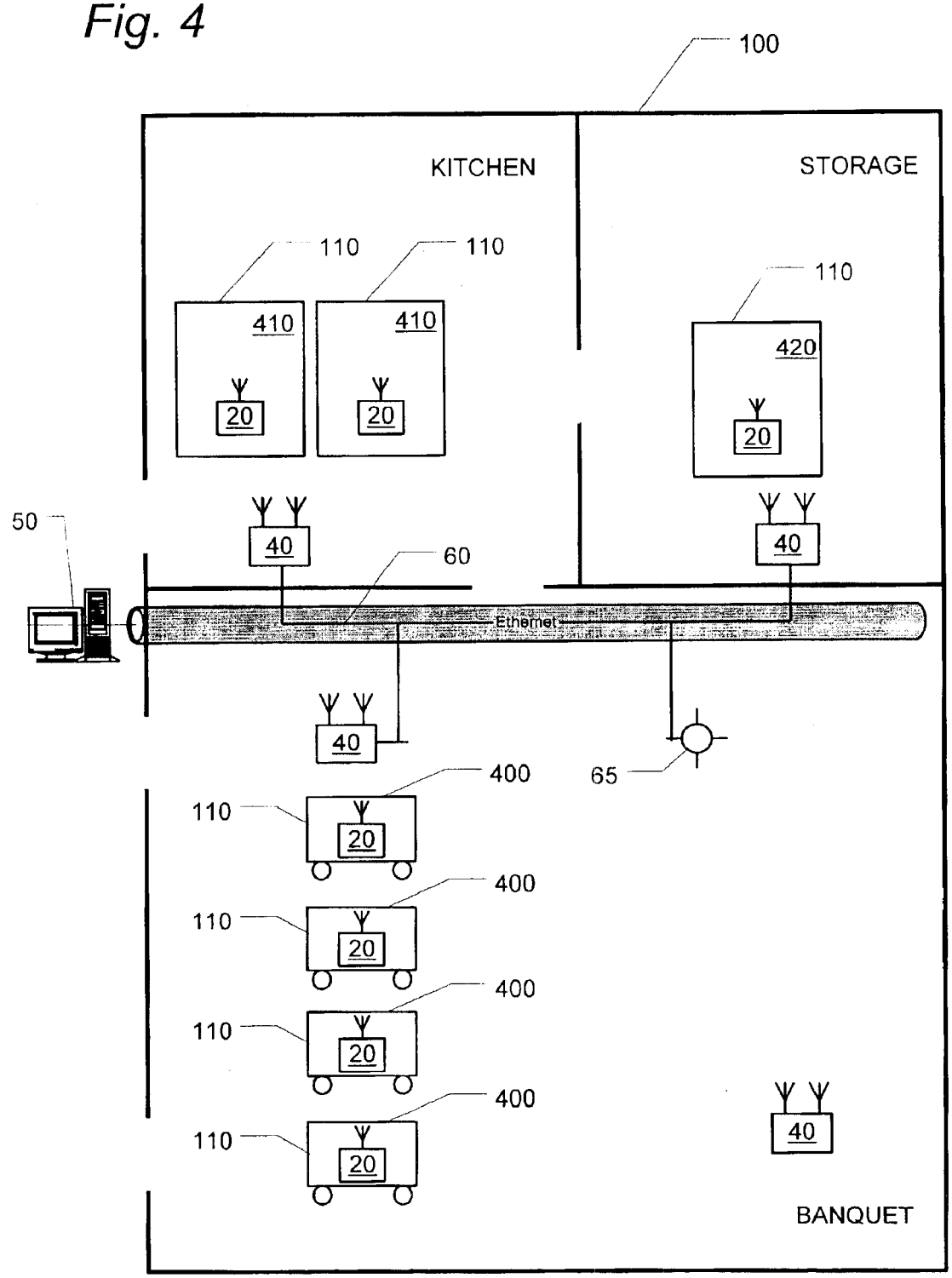
FIG. 4 is a schematic diagram of a typical implementation of the system in accordance with the preferred embodiments of the present invention.

The present invention may be implemented by installing or deploying the CMA 70, one or more of the translator units 40 and a plurality of the sensor units 20 in desired locations in a food service facility 100. FIG. 4 is a schematic diagram of a typical implementation of the system 10 in accordance with the preferred embodiments of the present invention. As shown therein, a typical food service facility 100 may include a kitchen, a storage room and a banquet hall. A plurality of portable food serving carts 400 may be stationed in the banquet hall, while refrigerators 410 may be located in the kitchen and a freezer 420 in the storage room. The central monitoring station 50 is shown located in another area of the facility 100 and is connected into the kitchen, storage room and banquet hall via a communications network 60. Of course, if such a communications network 60 is not already present in the facility 100, than such a network must be installed prior to, or in conjunction with, the installation of the system 10 of the present invention. The network 60 may be installed using standard installation techniques well known to one of ordinary skill. Where possible, care should be given to the routing of network cables either to facilitate easy direct connection of the necessary translator units 40 to the network 60, or, if wireless network access points 65 are to be utilized as described hereinbelow, to facilitate easy connection of the wireless network access points 65 to the network 60.

The CMA 70 is preferably provided to users in a form that may be readily installed on the server 52 using known software installation methods, while the sensor microcode 85 and translator software 87 are preferably preinstalled on the sensor and translator units 20, 40, respectively. Their use and operation will be described hereinbelow.

The number of translator units 40 to be installed or deployed is dependent upon the number of rooms in the facility 100 and their size and shape. In smaller facilities, with uniformly-shaped rooms, a single translator unit 40 in each room may be sufficient, while in very large rooms (such as the banquet hall in the example of FIG. 4) or non-uniformly shaped rooms, it may be necessary or desirable to use a plurality of translator units 40 in order to ensure that clear communication with each sensor unit 20 may be maintained or to provide more precision in determining the location of the sensor units 20 in that room, as further described hereinbelow.

Several criteria govern the installation or deployment locations of the translator units 40. First, each translator unit 40 (or set of modules, if more than one module is used within a particular room) should be centrally located within the room in which it is installed in order to facilitate clear communication with the sensor units 20 in that room. Also, because the translator units 40 are preferably "wall-powered," each translator unit 40 should preferably be installed within a reasonable distance from an electrical outlet to facilitate easy connection thereto. This is important in both semi-permanent and temporary deployments. Two other considerations depend upon whether a particular translator unit 40 is to communicate with the facility's communication network 60 via a direct wired connection to the wired network connection subsystem 46 or wirelessly via the wireless network communication subsystem 47, both of which are preferably available in each translator unit 40. If the translator units 40 are to be wired directly into the facility's communications network 60, it may be desirable to position the translator units 40 in close proximity to that network in order to facilitate easy connection thereto. Of course, if such a communications network 60 is being installed in conjunction with the installation of the system 10 of the present invention, than this latter consideration becomes somewhat less important. On the other hand, if the translator units 40 are to be used in conjunction with wireless network access points 65, then each translator unit 60 should be positioned to facilitate clear communication with at least one of the wireless network access points 65. Finally, if deployment of the translator units 40 is to be only temporary, then other factors may also come into play, including the ease of access to the deployment location, the ease of temporarily running an extension cord to supply power to the translator units 40 when wall power is not readily available, and whether the placement of the translator units 40 will interfere with activities or other equipment, furniture or the like in the facility 100.

Once their locations have been selected, the translator units 40 may be deployed by physically mounting them or otherwise positioning them. Many translator units 40 are intended to remain in place on a semi-permanent basis, in which case installation may be of a more permanent nature. However, the translator units 40 are preferably small enough to be easily transported from one location to another, and may alternatively be deployed temporarily if desired. For example, in a facility 100 having a large multi-purpose meeting room, a user may choose to temporarily deploy one or more translator units 40 only when the room is set up as a banquet hall, and to remove the translator units 40 when the rest of the banquet equipment is removed. Sensor units 20, on the other hand, have the capability to be moved and repositioned frequently, as described below. Once deployed, the translator units 40 may also be connected to their respective power sources and, if a direct wired network connection is utilized, to the communications network 60.

Preferably, an indication of the geographic location of each translator unit 40 is recorded at the CMA 70. In order to accomplish this, a unique identifier may be used for each translator unit 40. This identifier may be the translator unit's internet protocol ("IP") address, a user-defined identifier or address, or the like. The indication may typically correspond to a particular room in a food service facility 100, but other approaches may be used as well. For example, the geographic location for a particular translator unit 40 may correspond to only a portion of a room, a particular building, or the like. Preferably, various alternative geographic locations may be predefined by a user and the geographic location for a particular translator unit 40 may then be selected from a list of such alternatives. The indicator that is recorded may be a text message that reflects the corresponding geographic location, a numeric code that corresponds to a particular geographic location, or any other suitable location indicator. If desired, more than one translator unit 40 may be assigned to the same geographic location, in which case the geographic location indicator recorded at the CMA 70 would be the same for each such translator unit 40. The benefits of predefining a geographic location for each translator unit 40 will become apparent hereinbelow.

Each sensor unit 20 may be mounted on or adjacent to a food receptacle 110. Any suitable mounting means may be used to mount the sensor units 20. In conjunction with the mounting step, each sensor unit 20 may be programmed to reflect the type of food receptacle 110 on which it is mounted, its contents and its location. The location preferably corresponds to one of the defined translator unit locations. Once operational, the sensor unit 20 gathers temperature data, transmits such data to the server 52 via a translator unit 40 and the communications network 60, and indicates problems visually and/or aurally when commanded to do so by the server 52.

All substantive communications between the sensor units 20 and the CMA 70 running on the server 52 take place using the communications protocol 90. The communications protocol 90 defines the rules for passing messages between the sensor units 20 and the CMA 70 and the content and format of the data packets 500 containing those messages. The data packets 500 that are exchanged are preferably relatively simple in nature in order to keep the communications channel open. In addition, in order to maximize the number of sensor units 20 that may be used without causing data collisions, it is preferable for communications to generally be controlled by the CMA 70. Thus, the CMA 70 preferably serves as the network master and the sensor units 20 serve as slave nodes. Each message includes the address of the node to which it is addressed. In general, a slave node responds only to messages specifically addressed to it, thus saving the overhead and complexity of token passing and collision detection. A communications protocol suitable for use in a preferred embodiment of the present invention is the Scaleable Node Address Protocol ("S.N.A.P.") available from High Tech Horizons, Sweden. An implementation of S.N.A.P. that is suitable for use with a preferred embodiment of the present invention is described next.

Figure 5:
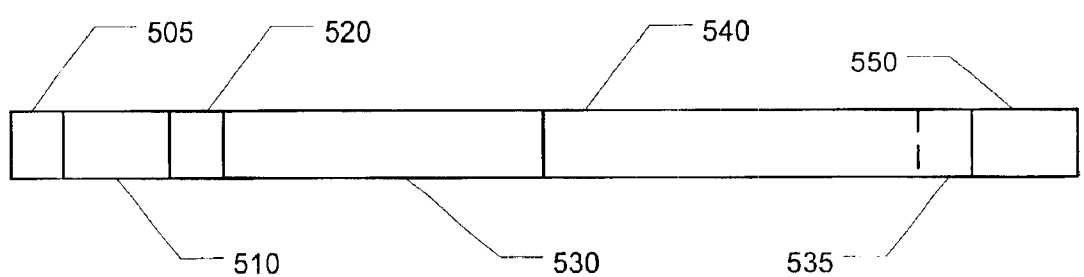
FIG. 5 is a diagram illustrating a data packet format suitable for use in a preferred embodiment of the present invention.

FIG. 5 is a diagram illustrating a data packet format suitable for use in a preferred embodiment of the present invention. As illustrated therein, each data packet 500 includes a "Synchronization" field 505, a "Header Definition" field 510, a "Destination Address" field 520, a "Source Address" field 530, a "Command" field 535, a "Data" field 540 and an "Error Checking" field 550. The Synchronization field 505, which is preferably one byte (8 bits) in length and which may be predefined to a value such as the binary value 01010100 (54 hexadecimal), is used to indicate the start of all system data packets 500. The Header Definition field 510 is preferably two bytes (16 bits) in length). The first three bits of the first byte of the Header Definition field 510 indicate the number of bytes in the Destination Address field 520; the next three bits of the first byte of the Header Definition field 510 indicate the number of bytes in the Source Address field 530, and the last two bits of the first byte of the Header Definition field 510 either indicate whether an acknowledgment of the message is requested (if the message is a request or command), or contain the acknowledgment (if the message is a response to a request or command). The first bit of the second byte of the Header Definition field 510 indicates whether the message is a command or a response. The next three bits of the second byte of the Header Definition field 510 indicate the type of error detecting method being used. Preferably, the error detecting method remains constant, so the value of these three bits remains constant at a predefined value. For example, if CRC-16 is always used, then these three bits may be fixed to the binary value 100 (04 hexadecimal). The last four bits of the second byte of the Header Definition field 510 indicate the sum of the number of bytes in the Command field 535 and the number of bytes in the Data field 540. In a preferred embodiment, the various values of this field correspond to a number of bytes in the range (0, 1, 2, 3, 4, 5, 6, 7, 8, 16, 32, 64, 128, 512). Thus, if the total number of bytes in the Command and Data fields 535, 540 is 16, then these four bits would have the binary value 1001 (9 hexadecimal).

In the preferred embodiment, the sensor units 20 and the CMA 70 are each assigned a unique identification number or address. The unique address of the component to which the data packet 500 is to be sent is included in the Destination Address field 520, and the unique address of the component sending the data packet 500 is included in the Source Address field 530. A component will respond only to those data packets 500 that contain that component's unique address in the Destination Address field 520. The Command field 535, which is preferably one byte (8 bits) in length, contains the command specified by the source component. The command may either be in the form of a request or a response. The Data field 540 includes any data that is being sent along with the command. The amount and type of data, if any, necessary for as well as one byte that contains the command itself. As described previously, the sum of the number of bytes of the Command and Data fields 535, 540 may preferably be any number in the range (0, 1, 2, 3, 4, 5, 6, 7, 8, 16, 32, 64, 128, 512). The length of the Error Checking field 550 depends on the type of error detecting method used. Any number of error detecting methods are known to those of ordinary skill in the art, but one method suitable for use in a preferred embodiment of the present invention is 16-bit cyclic redundancy code ("CRC") checking, which would require an Error Checking field 550 which is two bytes (16 bits) in length.

The exemplary data packet format and communication protocol 90 described herein may be used for all communications between the CMA 70 and the sensor units 20. However, it should be clear that other protocols may be developed and/or utilized without departing from the scope of the present invention.

Figure 6A:
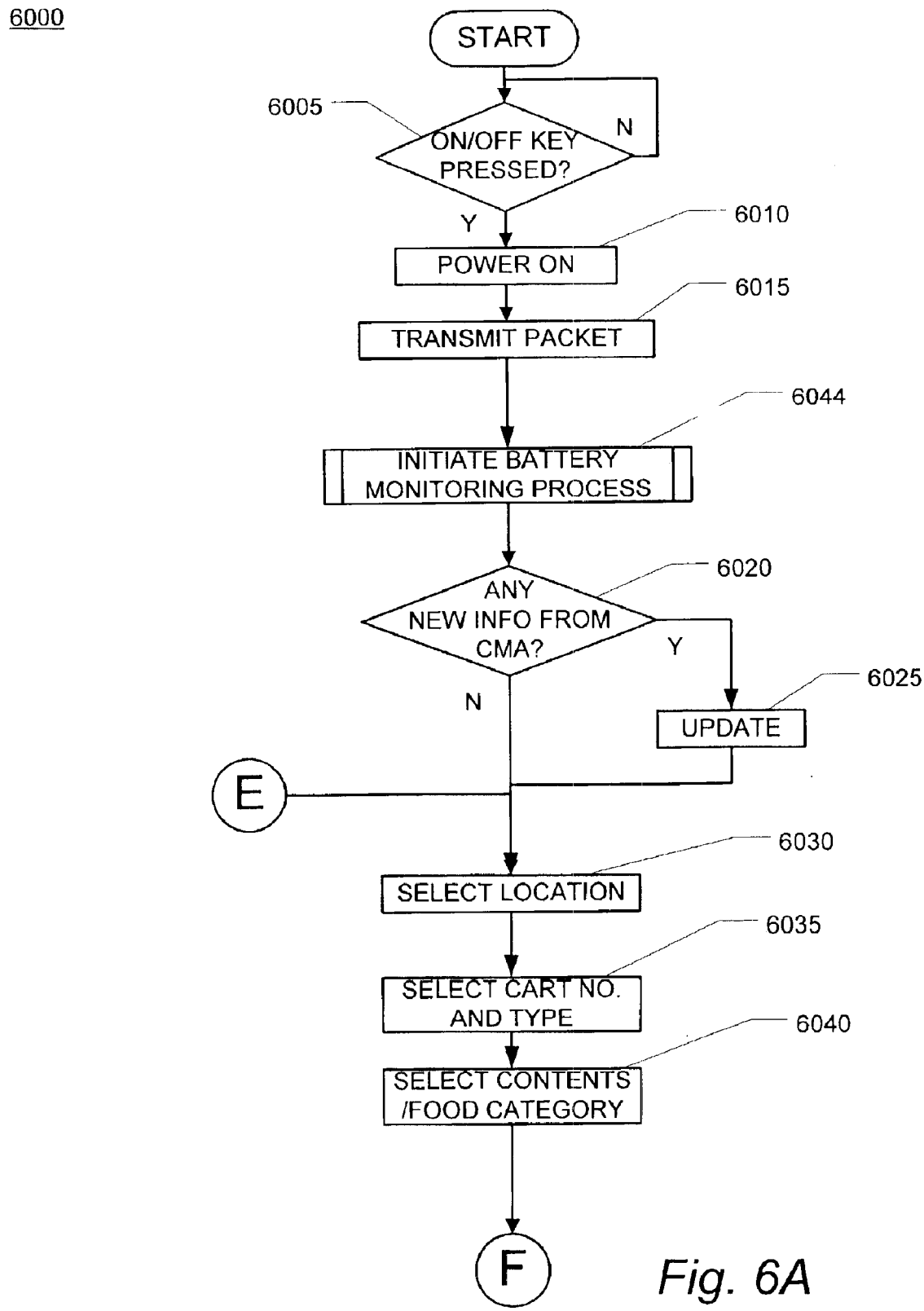
FIGS. 6A, 6B and 6C are flowchart diagrams illustrating steps taken by the sensor unit in conjunction with the sensor unit microcode of the present invention in executing steps of the sensor unit process.
Figure 6B:
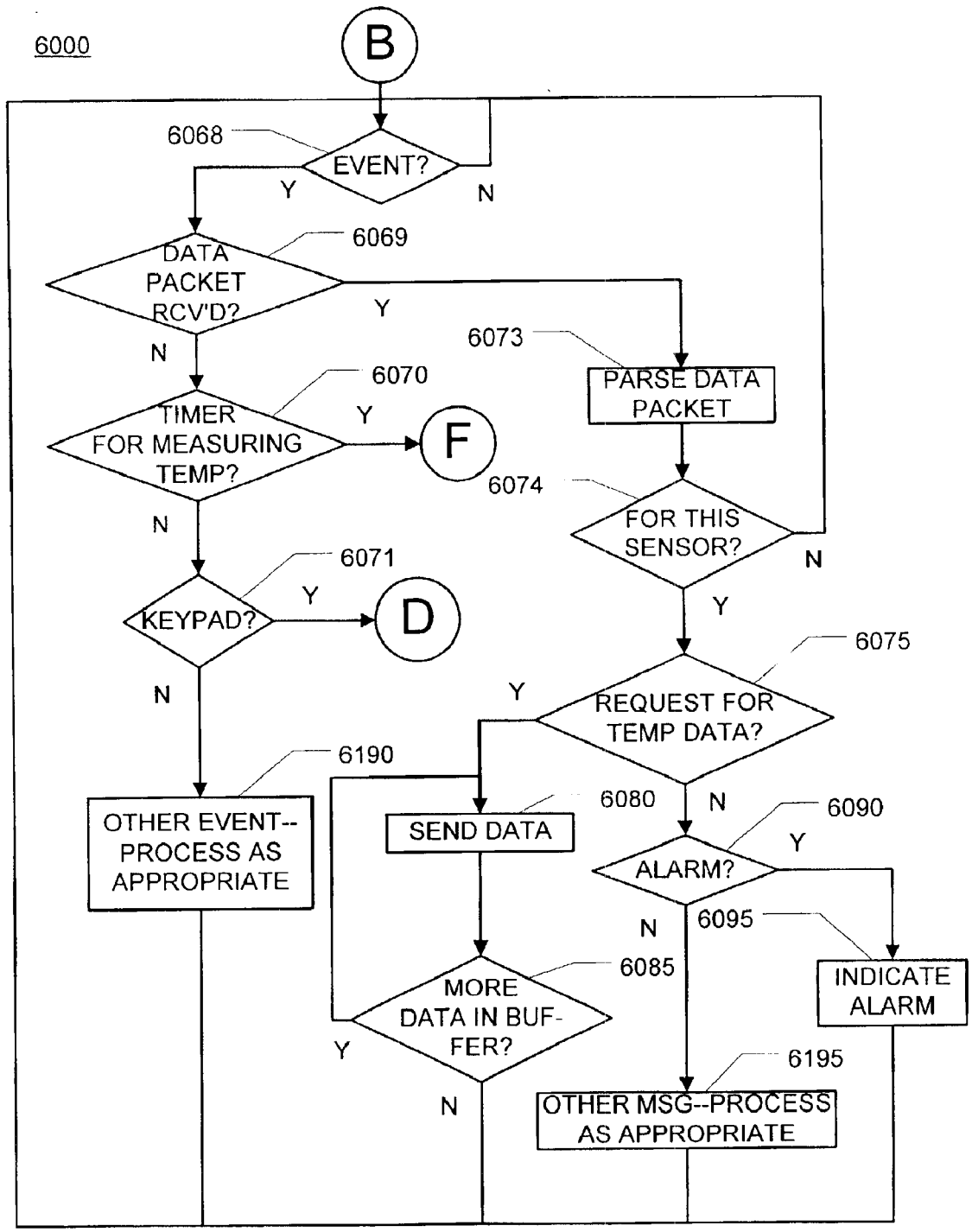
Figure 6C:
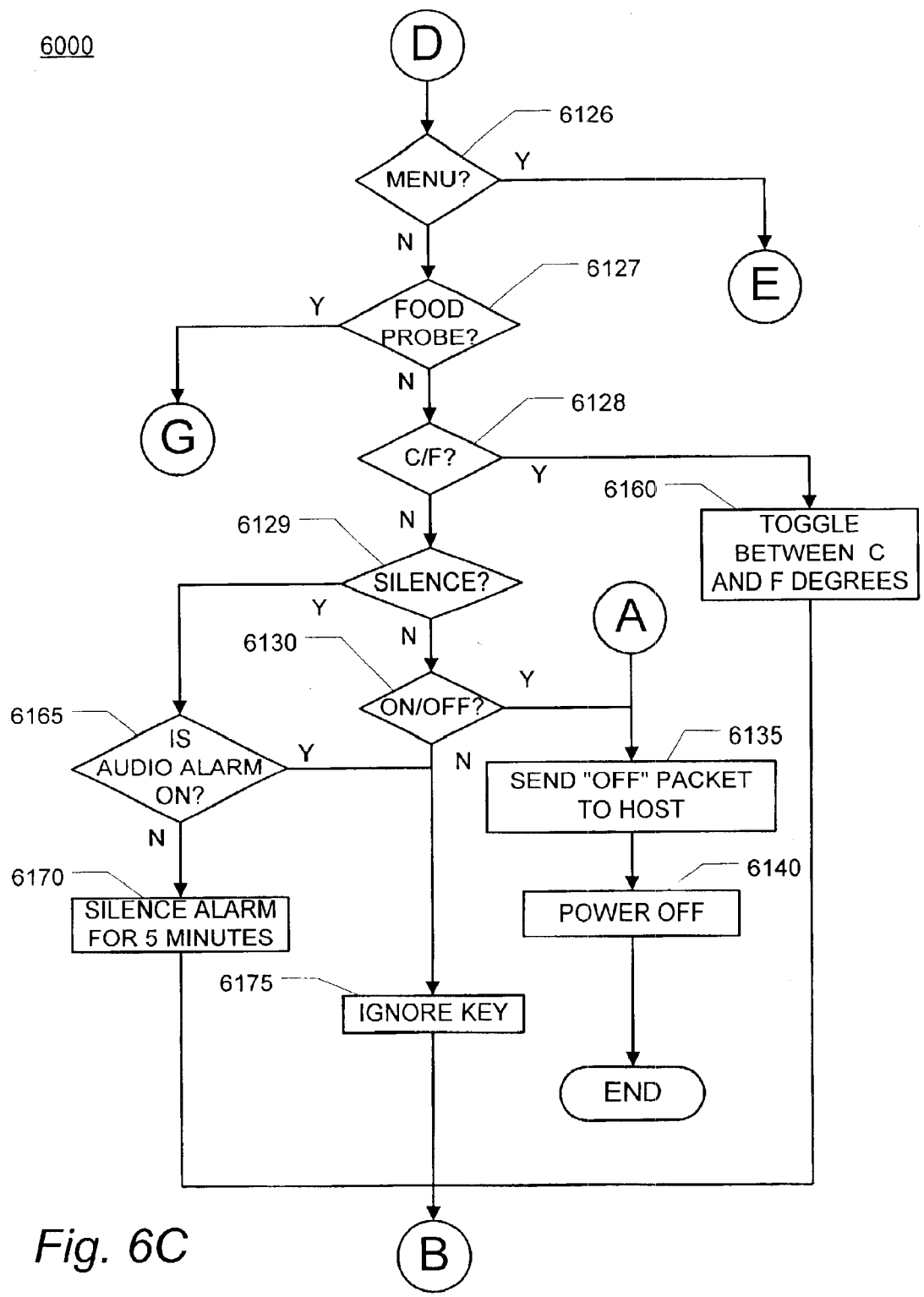

FIGS. 6A, 6B and 6C are flowchart diagrams illustrating steps taken by the sensor unit 20 in conjunction with the sensor unit microcode 85 of the present invention in executing the steps of the sensor unit process 6000. It should be noted, however, that these diagrams and the descriptions accompanying them herein are presented only for purposes of illustration of the general operation of the sensor units 20, and that the actual steps taken during operation of the modules may be rearranged or even different from the steps illustrated herein. Further, as noted previously, the microcode 85 is preferably developed in modules with functions as previously described. In all cases, however, the actual development of the microcode 85 would be obvious to one of ordinary skill in the art on the basis of the descriptions and illustrations herein.

Operation of the sensor unit process 6000 begins at step 6005 with the sensor unit remaining inactive until the power on key on the keypad is pressed. Once that key is pressed, power to the sensor unit 20 is turned on at step 6010, and the sensor unit 20 executes the "Initialize" function at step 6012 in order to initialize the internal hardware of the microprocessor 22 and the external hardware, including the display, and sets up the startup values for the variables used by the microcode 85. This may also include setting a timer for the temperature measurement functions. The timer may be set by inputting a predetermined value representing the desired period of time between temperature measurements. An amount suitable for use with a preferred embodiment of the present invention is five minutes. Also, either as part of the "Initialize" function or as a separate step (illustrated at step 6014) in the process of starting up the sensor unit 20, a battery monitoring process 7000 is initiated. The battery monitoring process 7000, which continues to run as long as the sensor unit 20 is in operation, monitors the battery pack 142 in order to warn the user of low battery reserve levels.

Figure 7:
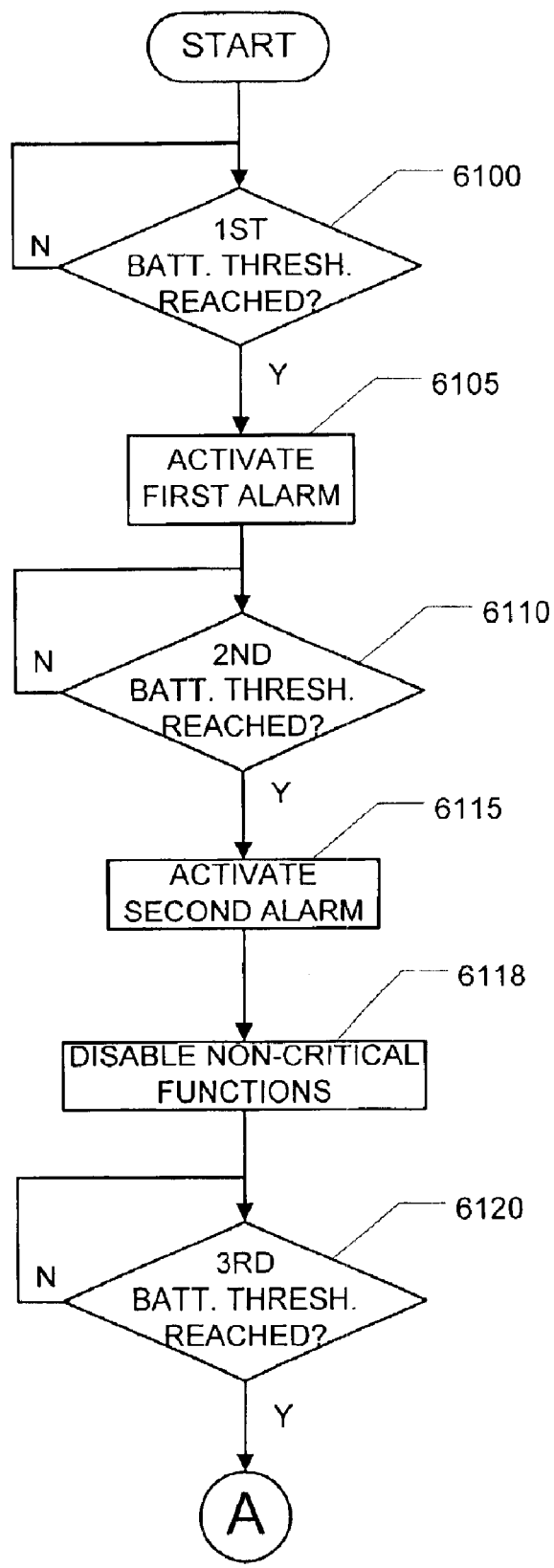
FIG. 7 is a flowchart diagram illustrating steps taken by the sensor unit in conjunction with the sensor unit microcode of the present invention in executing steps of the battery monitoring subprocess.

FIG. 7 is a flowchart diagram illustrating steps taken by the sensor unit 20 in conjunction with the sensor unit microcode 85 of the present invention in executing steps of the battery monitoring process 7000. Preferably, the warnings will occur in at least two stages before the sensor unit 20 is shut down. First, when it is determined at step 6100 that a first battery threshold level has been reached, a first alarm is provided to the user at step 6105. Similarly, when it is determined at step 6110 that a second battery threshold level has been reached, then a second alarm is provided to the user at step 6115. In an embodiment suitable for use with the present invention, the first and second threshold levels correspond to approximately 10 and 2 hours, respectively, of remaining battery life; the first alarm comprises displaying a suitable text message on the top line of the display 150 every minute for five seconds; and the second alarm comprises intermittently flashing the alarm indicator light 153, displaying a suitable text message on the display 150 every fifteen seconds, and sounding the audio alarm 154 every five seconds.

In addition to warning a user that the battery level is low, the battery monitoring process 7000 preferably also takes action to reduce the load on the battery pack 142. For example, when one of the predetermined threshold battery levels is reached, the battery monitoring process 7000 may, as illustrated at step 6118, disable certain non-critical functions, such as the operation of the RF modem 134 and any backlight for the LCD display 150. Although, as illustrated, this step is taken after the second predetermined threshold level is reached, it should be clear that similar steps could instead or in addition be taken after other threshold levels are reached. Finally, after previous attempts to warn the user of a low battery condition and to reduce the sensor unit's power consumption have been taken, the battery monitoring process 7000 monitors the battery pack 142 to determine when a final predetermined threshold level is reached. When the process 7000 determines that this threshold level has been reached, then the sensor unit 20 goes through a shutdown procedure, described hereinbelow. The battery fail safe 148 ensures that the sensor unit is shut down safely in the event of total power loss. One shut down, the sensor unit 20 remains in a "sleep" state until sufficient battery power is once again available, as detected by the charging circuit 144.

Returning to FIG. 6A, once the sensor unit 20 has been initialized, it next transmits a data packet 500 at step 6015 to the server 52 to let the central monitoring station 50 know that the sensor unit 20 is active and monitoring temperature conditions. The Data field 540 in this data packet 500 may include one or more CRC values corresponding to various aspects of the menu contents. Preferably, the Data field 540 includes one 16-bit CRC corresponding to the contents of each menu used by the sensor unit 20 to solicit input from a user, as described below. By examining these CRC values, the CMA 70 may quickly determine whether any of the menu contents in the sensor unit 20 need to be updated, and if so, the CMA 70 can instruct the server 52 to send updated menu contents to the sensor unit 20. If at step 6020 the sensor unit 20 receives such a message from the server 52, then the new menu contents will be uploaded into the sensor unit 20 at step 6025.

Once the sensor unit 20 has the latest menu contents, the sensor unit 20 may solicit input from the user pertaining to the food receptacle 110 to which the sensor unit 20 is being mounted. To accomplish this, the sensor unit 20 at steps 6030–6040 presents a series of menus to the user via the display 150 and waits for the user to make selections therefrom. These may include, at step 6030, a menu for selecting the location of the food receptacle 110; at step 6035, a menu for selecting the unit number of the food receptacle 110 and the type of food receptacle 110; and at step 6040, a menu for selecting the type of food being stored in the food receptacle 110. Each menu may comprise a plurality of predetermined choices displayed one or two lines at a time on the display 150. For example, the menu for selecting the location of the food receptacle 110 preferably includes a list of the translator unit locations that have been defined in a particular installation. In each menu, the "Arrow" keys 164 may be used to maneuver through the choices; the "Enter" key 166 may be used to select the desired choice in each menu; the "Clear" key 174 my be used to clear the last selection. Preferably, this series of menus may be subsequently accessed again at any time by pressing the "Menu" key 162 on the keypad 156. As described more fully hereinbelow, the user may preferably have the option of customizing the choices that are included in each menu using the CMA 70.

Figure 8:
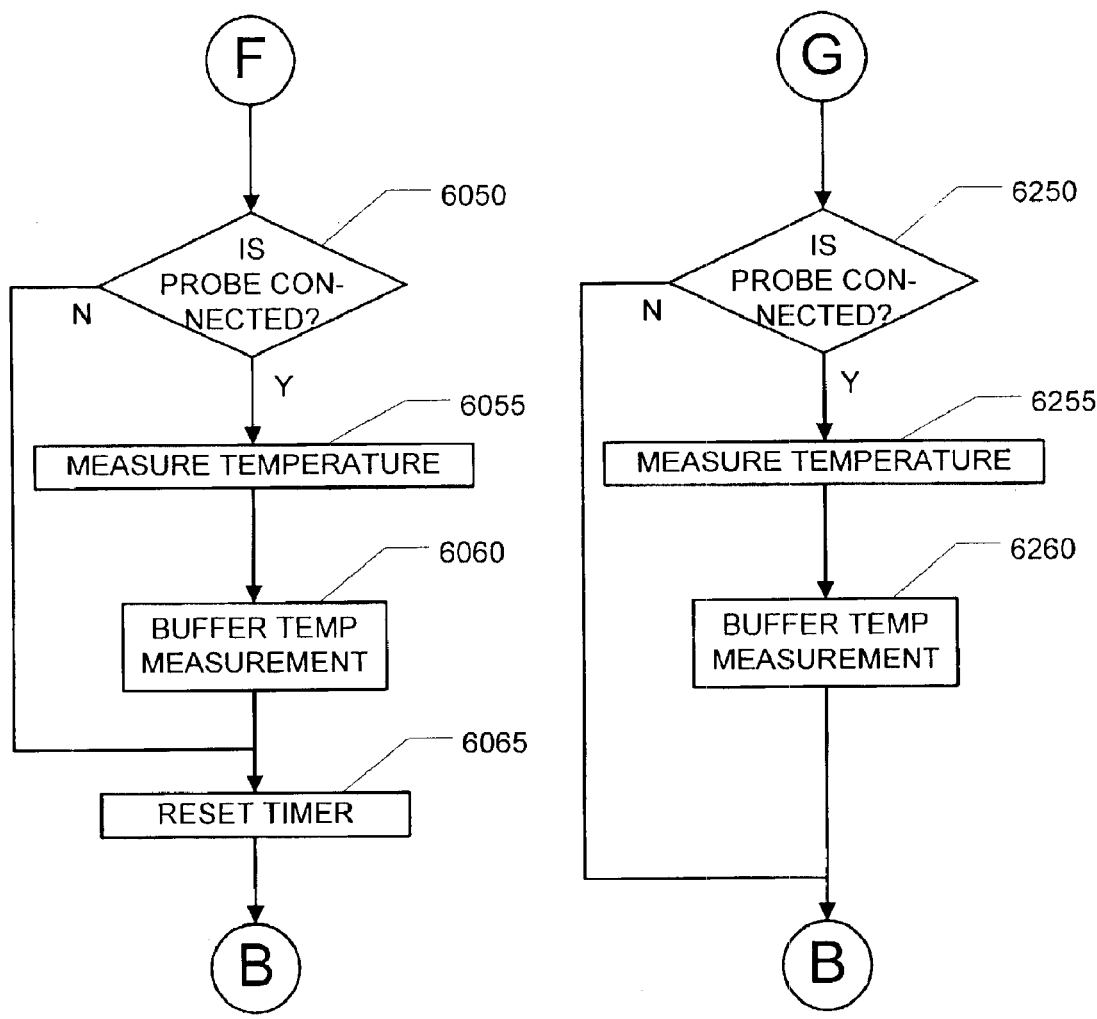
FIG. 8 is a flowchart diagram illustrating steps taken by the sensor unit in conjunction with the sensor unit microcode of the present invention in executing steps of the temperature monitoring subprocess.

Once the user has finished setting up the sensor unit 20, the sensor unit 20 is ready to start monitoring temperature or other food information and communicating the information to the central monitoring station 50. Automated temperature monitoring may be carried out by the automated portion of the temperature monitoring subprocess 8000, which may be initiated as soon as the sensor unit 20 is fully operational (i.e., as soon as steps 6030–6040 are completed). FIG. 8 is a flowchart diagram illustrating steps taken by the sensor unit 20 in conjunction with the sensor unit microcode 85 of the present invention in executing steps of the temperature monitoring subprocess 8000. The automated portion of the temperature monitoring subprocess 8000 begins at step 6050 as the sensor unit 20 executes the "Probes" function to determine whether one or more of the temperature probes used for automated temperature measurement are connected to the thermocouple sensors 120, 121 of the sensor unit 20. Preferably, if no probe is connected to one of the thermocouples 120, 121, then the sensor unit 20 sends a message to the CMA 70 indicating that that thermocouple is inoperable.

In the illustrated embodiment, automated measurements are made only via the ambient temperature thermocouple sensor 120, but it would be obvious to one of ordinary skill in the art that automated temperature measurements could be made, in the manner described, via the core food temperature thermocouple sensor 121 or another temperature measurement device, including one connected via the serial I/O port 138, without departing from the scope of the present invention.

If any temperature probes used for automated temperature measurement are connected, then at step 6055 the "TC_Convert," "TC_Ref," "A/D Converter" and "TC_Tables" functions are used to derive a digitized current temperature value for each temperature probe, and those digital values are buffered at step 6060 for transmission to the server 52. The timer that controls the amount of time that is to elapse before the next measurement is to be made is then reset at step 6065. When the timer determines that the predetermined period of time has elapsed, an "event" is caused. The event is recognized by the microprocessor 22 at steps 6068 and 6070 and then steps 6050–6065 are repeated. The automated portion of the temperature monitoring subprocess 8000 continues for as long as the sensor unit 20 remains active.

Turning now to FIGS. 6B and 6C, normal processing is handled by the "Main" function of the sensor unit 20, illustrated beginning at step 6068. The expiration of the temperature monitoring timer is just one of a number of possible events that may be handled by the "Main" function. Other events, not all of which are illustrated herein, include receiving data packets 500 from the CMA 70, communications on the serial input ports, the expiration of other timers, keys on the keypad 156 being pressed, and the like. At step 6068, the sensor unit 20 awaits the next event. When an event occurs, then further processing depends on the event's type, as determined at illustrative steps 6069–6071.

For example, if at step 6069 the event is the receipt of a data packet 500 at the RF modem 134 via the antenna 136, the data packet 500 is parsed at step 6073 to determine first, at step 6074, whether the data packet 500 is from the CMA 70 and whether the command embedded in the data packet 500 is intended for that sensor unit 20 or not. If so, then further action by the sensor unit 20 depends on what type of command has been received. If at step 6075 the command is a request for the sensor unit's temperature data, then at steps 6080 and 6085 the sensor unit 20 sends all buffered temperature values via the RF modem 134 using the "Host Serial Out" function. Also included in each data packet 500 sent by the sensor unit 20 are the date and time that the temperature values were determined and the sensor unit's identification number.

If on the other hand the command is not a request for temperature data (at step 6075) but an alarm condition notification, as illustrated at step 6090, then at step 6095 the sensor unit 20 takes appropriate actions to indicate the existence of the alarm condition. These actions may include turning on the alarm indicator light 153, turning on the audio alarm 154, displaying an appropriate text message on the display 150, and the like or a combination thereof. In a preferred embodiment, the alarm indicator light 153 is flashed intermittently, the audio alarm 154 is sounded, and the actual temperature value and the temperature limit that has been violated are displayed on the display 150. Control then returns to step 6068 to await another event. Finally, other commands from the CMA 70 are received and processed at step 6195 as appropriate, and control likewise returns to step 6068 to await another event.

Another example of an event is the receipt of an interrupt from the keypad 156, as illustrated at step 6071. When such a keypad interrupt is received, further processing depends on the key which has been pressed, as determined at steps 6126–6130. If, as illustrated at step 6126, the "Menu" key 162 is pressed, then the sensor unit 20 returns to steps 6030–6040 to solicit input from the user as described previously. If, as illustrated at step 6127, the "Food Probe" key 170 is pressed, then the manual portion of the temperature monitoring subprocess 8000, is initiated. As illustrated in FIG. 8, the manual portion of the temperature monitoring subprocess 8000 begins at step 6250 as the sensor unit 20 executes the "Probes" function to determine whether one or more of the temperature probes used for manual temperature measurement are connected to the thermocouple sensors 120, 121 of the sensor unit 20. Preferably, if no probe is connected to one of the thermocouples 120, 121, then the sensor unit 20 sends a message to the CMA 70 indicating that that thermocouple is inoperable. In the illustrated embodiment, manual measurements are made only via the core food temperature thermocouple sensor 121, but it would be obvious to one of ordinary skill in the art that manual temperature measurements could be made, in the manner described, via the ambient temperature thermocouple sensor 120 or another temperature measurement device, including one connected via the serial I/O port 138, without departing from the scope of the present invention. If any temperature probes used for manual temperature measurement are connected, then at step 6255 the "TC_Convert," "TC_Ref," "A/D Converter" and "TC_Tables" functions are used to derive a digitized current temperature value for each temperature probe, and those digital values are buffered at step 6260 for transmission to the server 52. The manual portion of the temperature monitoring subprocess 8000 is executed only when the "Food Probe" key 170 is pressed.

Returning to once again to FIG. 6C, if the "Celsius/Fahrenheit" key is pressed, as illustrated at step 6128, then at step 6160 the sensor unit 20 is toggled between Celsius and Fahrenheit temperatures. If, as illustrated at step 6129, the "Silence" key 168 is pressed, and if at step 6165 the audio alarm 154 or any other alarm indication is currently active, then at step 6171 the audio alarm 154 will be silenced or the other alarm deactivated for a predetermined period of time, which in a preferred embodiment may be five minutes. If the audio alarm 154 is not currently active, then the "Silence" key 168 is ignored. If, as illustrated at step 6130, the "On/Off" key 160 is pressed, then the sensor unit 20 first sends a data packet 500 of a predefined content to the server 52 at step 6135 to inform the central monitoring station 50 that the sensor unit 20 is going out of service. The sensor unit 20 then halts all other processing (including processing being carried out by the battery monitoring process 7000) and completes its power down sequence at step 6140. No further activity takes place until the unit 20 is once again turned on at step 6005. Finally, if the key pressed is not one of the keys identified at illustrative steps 6126–6130 (for example, if the key pressed is the "Enter" key 166, one of the "Arrow" keys 164 or the "Clear" key 174), then the key is ignored at step 6175 and control returns to step 6068 to await another event.

Other possible events include interrupts from the serial ports, timers, and the like. As illustrated at step 6070, one timer interrupt may be generated by the timer used to track the amount of time between temperature measurements. When that timer determines that the predetermined period of time has elapsed, the automated portion of the temperature monitoring subprocess 8000 is triggered once again, as described previously. In addition to interrupts from the RF modem 134, an interrupt may be received from a serial interface 140 upon the presence of data at the serial I/O port 138.

The operation of the translator unit 40 is controlled by its software 87 and is relatively straightforward. The translator unit 40 has two general functions: to receive transmissions from neighboring sensor units 20 and relay such transmissions to the server, and to receive transmissions from the server and broadcast them to enable their reception by the appropriate neighboring sensor unit 20. These functions are carried out as follows. First, with regard to communications from the sensor units 20 to the server 52, any transmission received by the sensor unit wireless communication subsystem 44 (in one preferred embodiment, the 900 MHz wireless transceiver) is packetized in the TCP/IP format and forwarded to the server 52 using either the wired or wireless network connection subsystem 46, 47 (in one preferred embodiment, the Ethernet or 802.11b controller, respectively). Although it may be included if desired, there is no need for error checking or maintenance on the data packets 500 from the sensor units 20, and the translator unit 40 does not even need to know which sensor unit 20 sent the data packet 500.

On the other hand, with regard to communications from the server 52 to the sensor units 20, each translator unit 40 listens for transmissions bearing its TCP/IP address and extracts the data packet 500 contained therein. The translator unit 40 then broadcasts the data packet 500 via its sensor unit wireless communication subsystem 44 under the assumption that the sensor unit 20 for which the data packet 500 is intended is within the broadcast range of the translator unit 40. Once again, there is no need for error checking or maintenance on the data packets 500, although such functionality may be included if desired.

Figure 9:
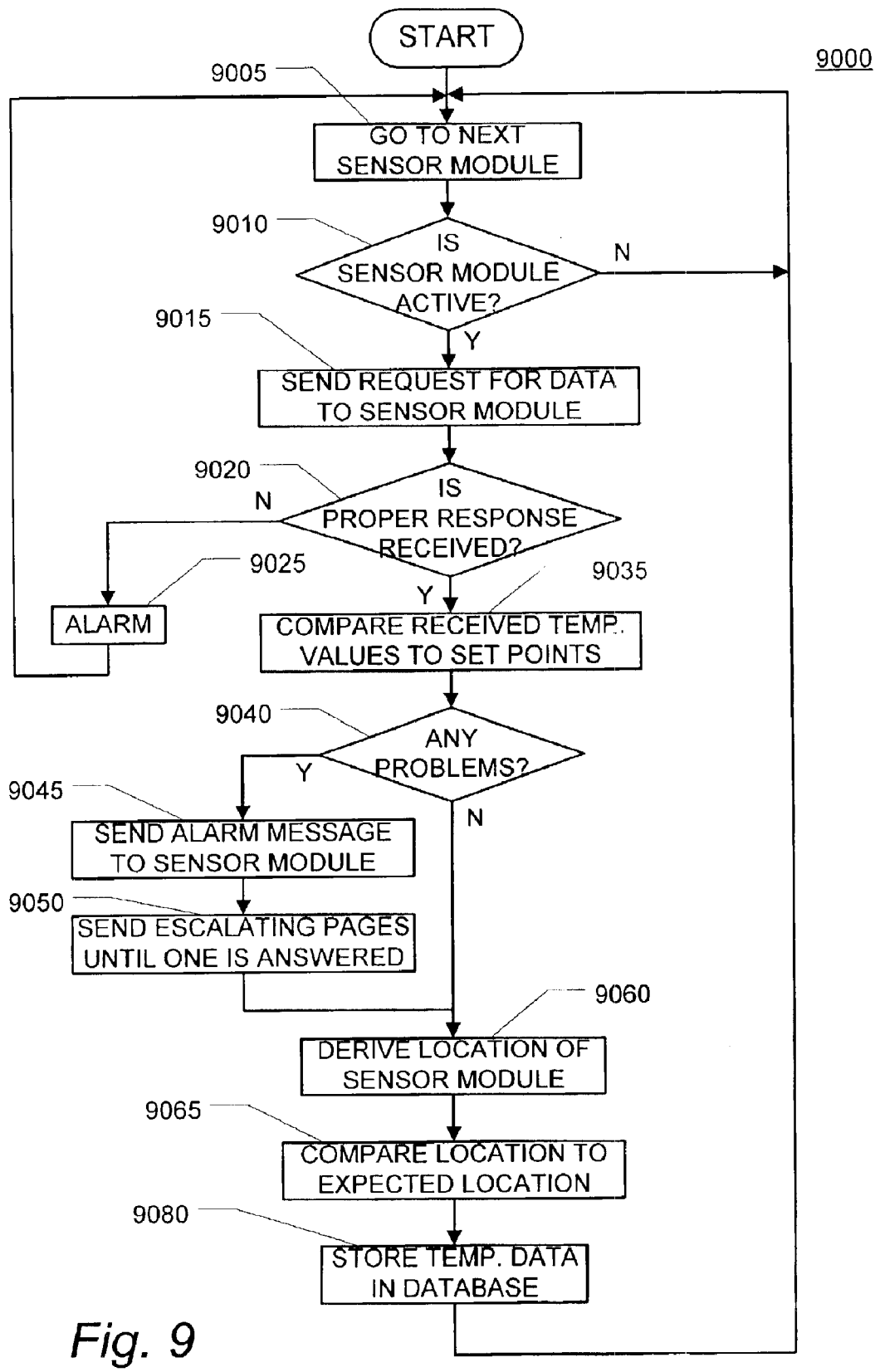
FIG. 9 is a flowchart diagram illustrating steps taken by the server in conjunction with the central monitoring and alert software application of the present invention in executing steps of the data collection process.

Overall control of the system is effectuated by the CMA 70. The CMA 70 primarily includes code for executing the steps of a data collection process 9000 and for generating a graphical user interface ("GUI") 80. FIG. 9 is a flowchart diagram illustrating steps taken by the server 52 in conjunction with the CMA 70 of the present invention in executing steps of the data collection process 9000. Beginning at step 9005, the CMA 70 continuously cycles through each active sensor unit 20, gathering, storing and analyzing temperature data and other sensor unit information. As illustrated at step 9010, the CMA 70 should preferably have the ability to distinguish between active and inactive sensor units. This may be accomplished by recording the status of all known sensor units 20 in a table, by continuously maintaining a table of active sensors and carrying out further operations only for the sensor units 20 in that table, or by other well-known programming means. Once the next active sensor unit 20 has been identified, the CMA 70 instructs the server 52 at step 9015 to send out a command, addressed to the identified sensor unit 20, requesting a status update. If at step 9020 a proper response is not received back from the identified sensor unit 20, then an alarm may be raised at step 9025; otherwise, the data collection process 9000 continues normally as next described.

Once the CMA 70 receives a proper response at step 9020, the CMA 70 begins analyzing the data. At step 9035, each temperature value received from the sensor unit 20 is compared to the minimum and/or maximum temperature values which have been established for the corresponding food receptacle type and the type of food stored therein. If one or more of the actual temperature values reported by the sensor unit 20 is out of range-that is, if an actual temperature value is greater than a preset maximum temperature value, or is less than a preset minimum temperature value-then at step 9045, the CMA 70 transmits an alarm condition notification message to the sensor unit 20 and looks for an acknowledgment response back from the sensor unit 20. When such a response is received, the CMA 70 notes the date and time of receipt. Also, at step 9050, the CMA 70 begins paging appropriate personnel to tend to the sensor unit 20 and the food receptacle 110 on which it is mounted. Paging may be carried out by email, by beeper, by telephone or by any other suitable means, and preferably includes an escalating sequence of personnel, whereby if the alarm condition still exists a predetermined period of time after the first page is sent, then the next user or user device in the sequence is paged, and so on until the alarm condition is cleared. The contact information (personnel, email addresses, telephone numbers, and the like) and the predetermined period of time may preferably be controlled by an administrator using the GUI 80.

At step 9060, the location of the sensor unit 20 is also derived. This may be accomplished by examining the TCP/IP address of the translator unit 40 from which the sensor unit's response was relayed. In one embodiment, a user may predefine the proper location for a particular sensor unit 20 (or a particular food receptacle 110), and the CMA 70 may determine, at step 9065, whether the sensor unit 20 or food receptacle 110 is currently located in its proper location or not, and a suitable alarm or other indication provided if it is not. The alarm may result in a user-perceptible alarm signal being generated at the CMA 70, at the incorrectly located sensor unit 20, elsewhere, or any combination thereof. Such an alarm signal may include an audible alert signal, a visual alert signal (such as a flashing light or the like), or a suitable indication generated by the GUI 80 on the video display unit 54 of the central monitoring station 50. Finally, all of the data and information provided by the sensor unit 20 or derived therefrom may be stored in a database for further use by the GUI 80. Table 2 shows the data that may be stored for each sensor unit 20 in an embodiment suitable for use with the present invention.

TABLE 2

| Data | Data Format/Type |
| --- | --- |
| location of the food receptacle | integer with look-up table |
| identification number for the food receptacle | integer with look-up table |
| contents of the food receptacle | integer with look-up table |
| date and time of the temperature values | mm/dd/yyyy hh:mm:ss |
| ambient temperature value | real number |
| minimum and maximum temperature values | (real number, real number) |
| temperature alarm? | logic 0/1 |
| date/time of sensor unit acknowledgment | mm/dd/yyyy hh:mm:ss |
| sensor unit identification number | 24 bit unique number |
| food probe temperature value | real number |

The data collection process 9000 then goes on to analyze the next sensor unit 20 at step 9005, and continues cycling through all of the active sensor units 20 for as long as the CMA 70 remains operational.

The CMA 70 also provides several other functions. First, data collected from the various sensor units 20 may be displayed to a user via the GUI 80. The data may be displayed in any of a variety of ways. First, the data may be displayed in a tabular format, with, for example, one row or column devoted to each sensor unit 20. In a preferred embodiment, the sensor units 20 are sorted or grouped by sensor unit location, but other sortings or groupings may also be used, and the GUI 80 may give the user the option of choosing the sorting or grouping to be used. The data displayed for each sensor unit 20 in a tabular format may include the following: the location of the food receptacle 110 with which the sensor unit 20 is associated; the identification number for the food receptacle 110; the contents of the food receptacle 110; the date and time the temperature values were recorded; the ambient temperature value; the minimum and maximum temperature values; an indication of whether a temperature alarm condition exists; the date and time of the sensor unit's acknowledgment of the alarm condition; the sensor unit identification number; and the food probe temperature value.

Figure 10:
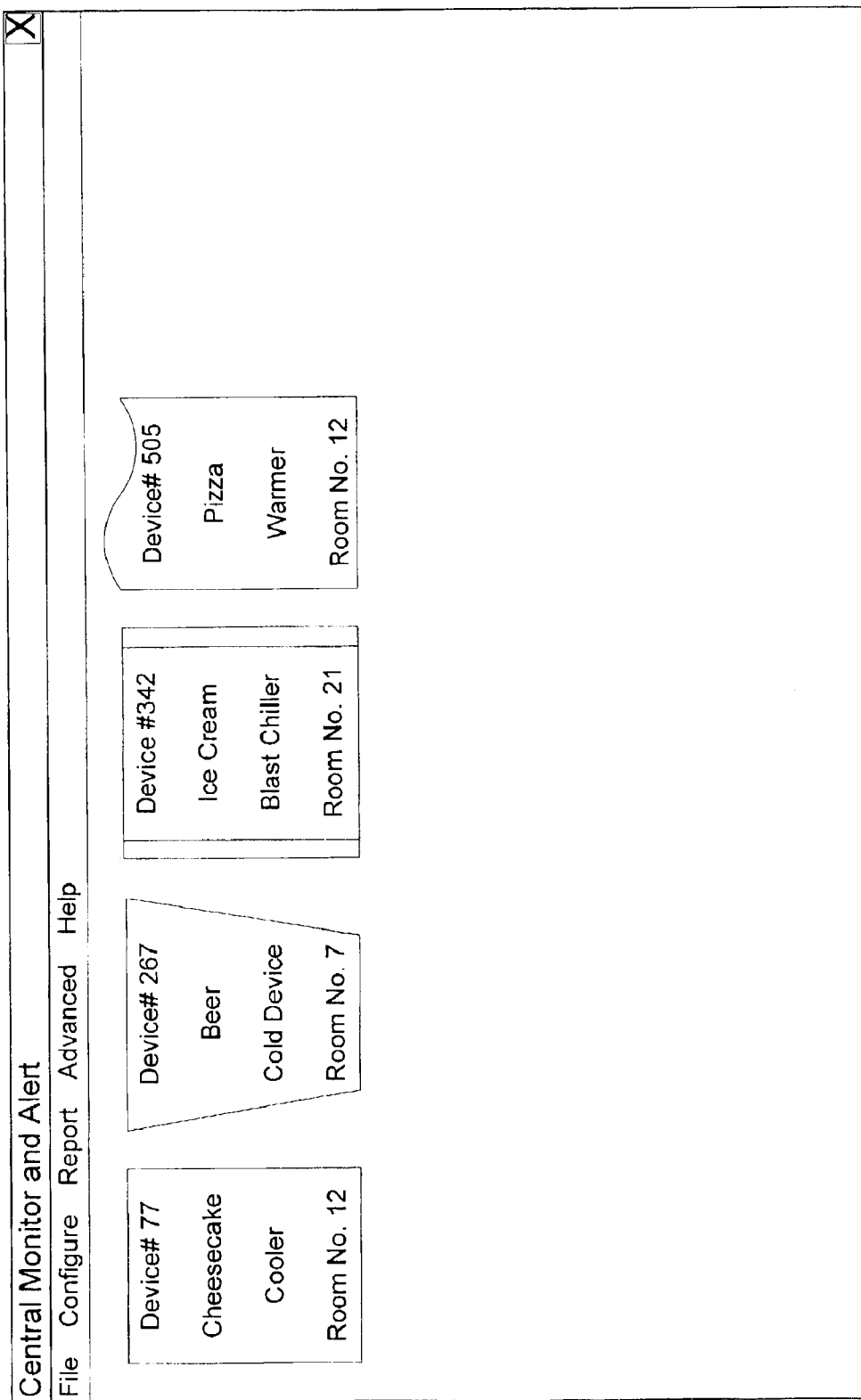
FIG. 10 is an exemplary view of an iconic display screen of the graphical user interface of the present invention.

In addition, the GUI 80 preferably has a mechanism for displaying the sensor units 20 in an iconic format. FIG. 10 is an exemplary view of an iconic GUI display screen. An appropriate icon may be chosen to represent each type of food receptacle 110. Preferably, a library of such icons is made available to the user for this purpose. A selected subset of information, preferably including at least the current temperature value reported by the sensor unit 20 and an indication of whether an alarm condition exists or not, may then be displayed along with each icon. Further information about a particular sensor unit 20 may then be accessed by selecting the corresponding icon. Information which may be displayed is similar to that in the tabular format.

Figure 11:
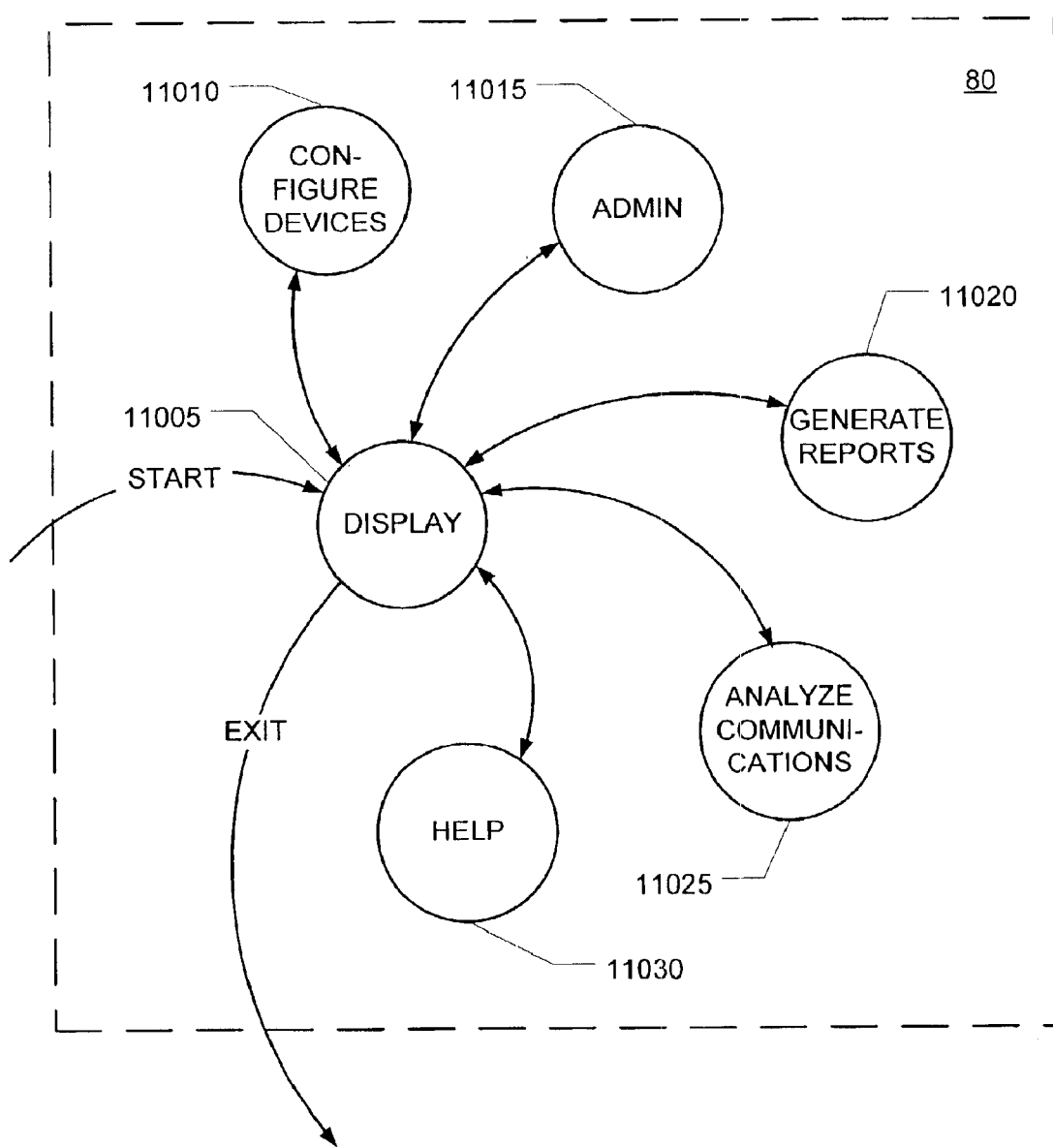
FIG. 11 is a state diagram illustrating the operation of a preferred embodiment of the graphical user interface of the present invention.

FIG. 11 is a state diagram illustrating the operation of a preferred embodiment of the GUI 80 of the present invention. In that diagram, each circle represents a state in which a user has one or more options for either performing an action within the current state or for proceeding to another state. If the user chooses to perform an action within his current state, the action is performed and the user remains in the current state. If the user chooses to proceed to another state, as represented by an arrow leading from the current state to the new state, the user is transferred from his current state to the chosen state, and a new set of options becomes available to the user A description of the states of a preferred embodiment of the GUI 80 and their interrelationship is described next. In the preferred embodiment, each state could represent one or more display screen, one or more web page, or the like.

In a particularly advantageous embodiment, a user of the GUI 80 first enters a main display state 11005, wherein the information from the various sensor units 20 in use around the facility 100 is displayed to the user. As described previously, the information may be displayed in a variety of formats, including, but not limited to, tabular and iconic formats, an example of the latter of which is shown in FIG. 10. In addition to displaying current food receptacle information, as gathered by the sensor units 20, in the main display state 11005, the user preferably has the following options: configuring food receptacles 110, controlling administrative functions, generating reports, analyzing sensor unit communications, seeking online help, and exiting. If a user chooses to configure food receptacles 110, then the GUI 80 proceeds to a configure food receptacle state 11010. In the configure food receptacles state 11010, the options available to the user may include, but are not limited to, the ability to configure food receptacle types, food receptacle locations, and food receptacle contents. It is this information that is communicated to each sensor unit 20 so that when the sensor unit 20 is installed on a food receptacle 110, the current food receptacle type choices, food receptacle location choices and food receptacle content choices are made available for selection by the installer.

The GUI 80 may include separate display screens for configuring food receptacle types, food receptacle locations and food receptacle contents. It should be clear, however, that all of these attributes might alternatively be configured on the same display screen if desired. FIG. 12 is a preferred display screen for use in the GUI 80 for configuring food receptacle types. As illustrated therein, the user may input a plurality of different types of food receptacles, with each type being assigned a different reference number. The food receptacle types are preferably selected by the user to correspond with specific types of food receptacles 110 used in the facility 100. In one preferred embodiment, the user may input, for each food receptacle type, the name of a file containing a graphical icon to be associated with the food receptacle type in a GUI 80 using an iconic display. The user may also input temperature limits, such as temperature minimums, maximums, or both, for each food receptacle type and a range of sensor unit numbers that are to be made available to food receptacles of each receptacle type.

FIG. 13 is a preferred display screen for use in the GUI 80 for configuring food receptacle locations. As illustrated therein, the user may input a plurality of different food receptacle locations, with each type being assigned a different reference number. The food receptacle locations are preferably selected by the user to correspond with specific locations in the facility 100. In one preferred embodiment, the user may input, for each food receptacle location, the name of a file containing a graphical icon to be associated with the food receptacle location in a GUI 80 using an iconic display. The user may also input a maximum transit time for the food receptacle location. FIG. 14 is a preferred display screen for use in the GUI 80 for configuring food receptacle contents. As illustrated therein, the user may input a plurality of different food receptacle contents, with each of the possible contents being assigned a different reference number. The food receptacle contents are preferably selected by the user to correspond specific foods or types of food that are handled in the facility 100. In one preferred embodiment, the user may input, for each food receptacle contents, the name of a file containing a graphical icon to be associated with the food receptacle contents in a GUI 80 using an iconic display.

Although not illustrated, in an alternative embodiment, the CMA 70 may provide the user with a GUI facility for inputting temperature limits for each type of food receptacle contents rather than, or in combination with, the temperature limits established for the various food receptacle types, or for inputting temperature limits based on some other criteria. Regardless of which parameter or combination of parameters the temperature limits are to be keyed off of, once temperature limits are established for a particular type of receptacle, food, or the like, then the temperature limits for a particular sensor unit 20 may be initialized simply by inputting the type of receptacle, food, or alternative parameter corresponding to the food receptacle 110 to which the sensor unit 20 has been assigned. The temperature limits corresponding to that parameter, or combination of criteria, may then be automatically assigned to the sensor unit 20 without having to manually re-input the temperature values again for each sensor unit 20. Thus, the temperature limits for a particular sensor unit 20 are established simply by selecting a particular food receptacle parameter or parameter combination.

Returning to the main display state 11005, if a user instead wishes to control administrative functions, then the GUI 80 proceeds to an administration state 11015. In the administration state 11015, the options available to the user may include, but are not limited to, the ability to specify paging information, set up communications information for the central monitoring station 50 and set up password information. If a user chooses to specify paging information, then the user may be presented with an interface for inputting paging information. FIG. 15 is a preferred display screen for use in the GUI 80 for controlling paging information. As illustrated therein, the user may input a plurality of different contacts, with each of the contents being assigned a different, sequential number. The user may also input means for communicating with the specified contact and a time period for which the system 10 is to wait, after receiving an alarm, before attempting to communicate with the contact. As shown, each contact is a person, and the communication means is email, but as described previously, other means may be used without departing from the scope of the present invention. On the other hand, if the user chooses to set up communications information for the central monitoring station 50, then the user may be presented with an interface for controlling communications information. Such an interface preferably includes means for specifying whether the computer on which the GUI 80 is operating is the computer 52 of the central monitoring station 50 or not; for entering a "server host," a "server port" and an "interval time;" and for entering communications port parameters such as the port number, whether parity is used, the baud rate, the number of stop bits, the number of data bits, and whether to use a serial port. Finally, if the user chooses to set up password information, then the user may be presented with an interface for setting one or more passwords. In a preferred embodiment, at least two levels of control are utilized, and thus separate passwords may be established for normal users and for administrators, with administrators having more control over configurations and the like.

Returning to the main display state 11005, if a user instead wishes to generate one or more reports, then the GUI 80 proceeds to a report generation state 11020. In the report generation state 11020, the user may generate reports for viewing, editing, printing and the like. Reports which may be available include, but are not limited to, a food receptacle type report, a food receptacle location report, a food receptacle contents report, and a paging information report. Each of these reports may be generated in a format that mimics that shown in the respective exemplary display screens of FIGS. 12–15. In addition, the user may have the option of generating a log report. Preferably, the GUI 80 also gives the user the ability to control a variety of parameters in generating such a report. FIG. 16 is a preferred display screen for use in the GUI 80 for controlling the parameters used in the generation of a log report. As illustrated therein, the user may be able to select the type of log entries to include in the report, select the timeframe covered by the report, select the food receptacles ("Device Number") that are covered by the report, and select the food receptacle types ("Device Type") that are covered by the report. FIG. 17 illustrates a preferred report format for the log report. Preferably, all of the reports may be generated at least in a format suitable for use in other standard applications, such as a spreadsheet of a standard type.

Returning to the main display state 11005, if a user instead wishes to analyze sensor unit communications, then the GUI 80 proceeds to an analyze communications state 11025. In the analyze communications state 11025, the user may view the data packets 500 being transmitted and received by the central monitoring station 50 to and from the sensor units 20 via the translator units 40. Log messages or information about timeouts and the like may also be displayed here.

Finally, returning once again to the main display state 11005, if a user instead wishes to seek online help, then the GUI 80 proceeds to a help state 11030. In the help state 11025, the user may be able to access textual or other information pertaining to the operation of the GUI 80, the CMA 70, or the system 10 in general. Means for presenting such information to a user are well known to those of ordinary skill in the art.

Sensor unit data in a tabular format or an iconic format may be further organized by "zone." Using the GUI 80, a user may be able to assign sensor units 20 to particular zones, which may be predefined by the user on the basis of the physical layout of the facility 100 or on some other basis. For example, the exemplary facility 100 may be arbitrarily divided into three zones corresponding respectively to the kitchen, storage room and the banquet hall, respectively. The sensor units 20 in the kitchen thus may be assigned to the kitchen zone; the sensor units 20 in the storage room may be assigned to the storage room zone; and the sensor units 20 in the banquet hall may be assigned to the banquet hall zone. Alternatively, however, a zone may include two separate rooms, such as the kitchen and the storage room, or one room, such as the banquet hall, may be subdivided into two separate zones. It should be apparent that a sensor unit's zone is not necessarily the same as a sensor unit's assigned geographic location. Assignment of a particular sensor unit 20 may be accomplished manually by the user or on the basis of the location of the translator unit 40 through which that sensor unit 20 communicates with the CMA 70. Once a facility's zones are defined, the GUI 80 may preferably permit data for all of the sensor units 20 in a particular zone to be displayed in a tabular format, an iconic format, or another format, so that the sensor units 20 in that zone may be studied in isolation from sensor units 20 in other zones.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A food information system, the system comprising:
   a plurality of remote units, each having a sensor device that detects data indicative of a particular food condition, wherein each remote unit is assigned to a designated food receptacle containing food, and wherein the food receptacle and the food are each of a categorizable type;
   a central computer that gathers data from the plurality of remote units; and
   a graphical user interface, operable in conjunction with the central computer, that displays to a user:
   a graphical entry for each remote unit,
   an indication of the type of food receptacle to which each respective remote unit is assigned, and
   an indication of the type of food contained in the food receptacle to which each respective remote unit is assigned.

2. The system of claim 1, wherein the graphical user interface is further operable, in conjunction with the central computer, to display to a user the data detected by each remote unit.

3. The system of claim 2, wherein each sensor device includes a temperature sensor, and wherein the detected data includes a temperature measurement.

4. The system of claim 2, wherein the graphical entries for the plurality of remote units are arranged in a table.

5. The system of claim 2, wherein the graphical entry for each remote sensor unit is an icon.

6. The system of claim 5, wherein the indication of the food receptacle type is a text message superimposed over the respective remote sensor unit icon.

7. The system of claim 5, wherein the indication of the food type is a text message superimposed over the respective remote sensor unit icon.

8. The system of claim 5, wherein a unique icon is associated with each different food receptacle type, and wherein the type of icon that is displayed for each remote unit is indicative of the food receptacle type to which the respective remote unit is assigned.

9. The system of claim 5, wherein a unique icon is associated with each different food type, and wherein the type of icon that that is displayed for each remote unit is indicative of the type of food contained in the food receptacle to which the respective remote unit is assigned.

10. The system of claim 1, wherein the graphical user interface is further operable, in conjunction with the central computer, to display to a user a unique identification number for each remote unit.

11. The system of claim 1, wherein the graphical user interface is further operable, in conjunction with the central computer, to display to a user an indication of whether or not an alarm condition exists for each remote unit.

12. A method in a computer system for displaying food information to a user, the method comprising the steps of:

assigning each of a plurality of remote sensor units to a designated food receptacle containing food;

categorizing each food receptacle into one of a plurality of food receptacle types; and for each assigned remote sensor unit, displaying, at a central location:

an indication of the type of food receptacle to which the remote sensor unit is assigned, and an indication of the food stored in the food receptacle to which the remote sensor unit is assigned.

13. The method of claim 12, further comprising the step of categorizing foods that may be stored in each food receptacle into one of a plurality of food types.

14. The method of claim 13, wherein the step of displaying, for each remote sensor unit, an indication of the food stored in the food receptacle to which the remote sensor unit is assigned includes displaying an indication of the type of food stored in the food receptacle.

15. The method of claim 12, further comprising the step of detecting, at each remote sensor unit, data indicative of a particular food condition.

16. The method of claim 15, wherein the particular food condition is a food temperature.

17. The method of claim 15, further comprising the step of displaying, at a central location, the data detected by each remote sensor unit.

18. The method of claim 17, wherein the detected data is displayed in real time.

* * * * *